US012600192B2

(12) United States Patent　　Appel et al.

(10) Patent No.: US 12,600,192 B2
(45) Date of Patent: Apr. 14, 2026

(54) INTEGRATED THERMAL MANAGEMENT SYSTEM

(71) Applicant: Hyroad Networks LLC, Austin, TX (US)

(72) Inventors: Christian Appel, Phoenix, AZ (US); Aiden Cohan, Phoenix, AZ (US); Rachel Cook, Phoenix, AZ (US); Mohamed Ibrahim Eldesouky Azab, Phoenix, AZ (US); Rohan Gumaste, Phoenix, AZ (US); Jaeseung Lee, Phoenix, AZ (US); Akshit Markan, Tempe, AZ (US); William Marley, Kansas City, MO (US); Derek McVay, Phoenix, AZ (US); Hamideh Pourhashem, Phoenix, AZ (US); Manuel Varwick, Ulm (DE)

(73) Assignee: HYROAD NETWORKS LLC, Austin, TX (US)

( * ) Notice: Subject to any disclaimer, the term of this patent is extended or adjusted under 35 U.S.C. 154(b) by 644 days.

(21) Appl. No.: 17/938,741

(22) Filed: Oct. 7, 2022

(65) Prior Publication Data

US 2023/0364962 A1　Nov. 16, 2023

Related U.S. Application Data

(60) Provisional application No. 63/364,659, filed on May 13, 2022.

(51) Int. Cl.
*B60H 3/00*　　　(2006.01)
*B60H 1/00*　　　(2006.01)
(Continued)

(52) U.S. Cl.
CPC ..... *B60H 1/00278* (2013.01); *B60H 1/00392* (2013.01); *B60H 1/143* (2013.01); (Continued)

(58) Field of Classification Search
CPC ........... B60H 1/00278; B60H 1/00392; B60H 1/143; B60H 2001/00307; B60L 58/32; H01M 8/04074; H01M 2250/20
(Continued)

(56) References Cited

U.S. PATENT DOCUMENTS

2010/0273079 A1　10/2010　Hinsenkamp et al.
2017/0012310 A1　1/2017　Han
(Continued)

FOREIGN PATENT DOCUMENTS

KR　　20090057491 A　*　6/2009　........ H01M 8/04029
KR　　20220034943 A　*　3/2022　............. F16D 57/00

OTHER PUBLICATIONS

ISA; International Search Report and Written Opinion date May 4, 2023 in PCT/US2023/021075.
(Continued)

*Primary Examiner* — Davis D Hwu
(74) *Attorney, Agent, or Firm* — SNELL & WILMER L.L.P.

(57)　　　　　　ABSTRACT

An integrated thermal management system for a fuel cell electric vehicle is disclosed. The integrated thermal management system includes a fuel cell system, a brake resistor, a fuel cell coolant loop that includes a fuel cell radiator thermally and fluidly coupled to the fuel cell system, a brake resistor coolant loop that includes a brake resistor radiator thermally and fluidly coupled to the brake resistor, and a heat exchanger loop that includes a coolant-coolant heat exchanger thermally and fluidly coupled to the fuel cell coolant loop and the brake resistor coolant loop. In a fuel cell cooling operating mode, heat is transferred from the fuel cell system to an ambient environment through the fuel cell radiator and the brake resistor radiator.

20 Claims, 16 Drawing Sheets

(51) Int. Cl.
    *B60H 1/14*          (2006.01)
    *B60L 58/32*       (2019.01)
    *H01M 8/04007*   (2016.01)

(52) U.S. Cl.
    CPC ......... *B60L 58/32* (2019.02); *H01M 8/04074*
        (2013.01); *B60H 2001/00307* (2013.01);
                       *H01M 2250/20* (2013.01)

(58) Field of Classification Search
    USPC ........................................................ 165/42
    See application file for complete search history.

(56)             References Cited

U.S. PATENT DOCUMENTS

| | | |
|---|---|---|
| 2018/0254500 A1 | 9/2018 | Jeong |
| 2019/0165387 A1 | 5/2019 | Farnsworth |
| 2019/0165395 A1 | 5/2019 | Farnsworth |
| 2021/0036342 A1 | 2/2021 | Seo |
| 2021/0347265 A1 | 11/2021 | Park |
| 2022/0029182 A1 | 1/2022 | Li |
| 2022/0209265 A1 | 6/2022 | Won |
| 2023/0155149 A1 | 5/2023 | Farnsworth |

OTHER PUBLICATIONS

Non-Final Office Action dated Jul. 28, 2025 in U.S. Appl. No. 18/322,283.

* cited by examiner

INTEGRATED THERMAL MANAGEMENT SYSTEM

CROSS-REFERENCE TO RELATED APPLICATIONS

This application claims priority to, and the benefit of, U.S. Provisional Patent Application No. 63/364,659 filed on May 13, 2022 entitled "Integrated Thermal Management System." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to thermal management systems, and more particularly, to thermal management systems for fuel cell vehicles.

BACKGROUND

Fuel cell electric vehicles (FCEVs) utilize multiple fuel cells, combined in one or more fuel cell stacks, to generate an electric current to power one or more system components to operate the vehicle. For example, electric current generated by the fuel cell stack may be used to power one or more electric motors to drive the vehicle's wheels as well as power multiple other electrically operated systems of the vehicle. The electrochemical processes used by the fuel cell stack to generate this current may generate large amounts of heat that may desirably be disposed to prevent adverse impact on fuel cell and vehicle lifespan and performance. In addition, heat generated during regenerative braking may need to be disposed through one or more brake resistors. Approaches which utilize these sources of waste heat in alternative ways to increase system thermal efficiency and increase vehicle lifespan and performance are desirable.

SUMMARY

An integrated thermal management system for a fuel cell electric vehicle may comprise a fuel cell system, a brake resistor, a fuel cell coolant loop comprising a fuel cell radiator thermally and fluidly coupled to the fuel cell system, a brake resistor coolant loop comprising a brake resistor radiator thermally and fluidly coupled to the brake resistor, and a heat exchanger loop comprising a coolant-coolant heat exchanger thermally and fluidly coupled to the fuel cell coolant loop and the brake resistor coolant loop. In a fuel cell cooling operating mode, heat is transferred from the fuel cell system to an ambient environment through the fuel cell radiator and the brake resistor radiator.

In various embodiments, the fuel cell coolant loop may comprise a first coolant and the brake resistor coolant loop may comprise a second coolant. Heat may be transferred from the first coolant to the second coolant in the coolant-coolant heat exchanger. The heat exchanger loop may further comprise a shutoff valve downstream of the fuel cell system and upstream of the coolant-coolant heat exchanger. In the fuel cell cooling operating mode, the shutoff valve may be open to permit at least a portion of a first coolant to flow through the coolant-coolant heat exchanger. The integrated thermal management system may further comprise an HVAC coolant loop thermally and fluidly coupled to the brake resistor coolant loop. In the fuel cell cooling operating mode, the HVAC coolant loop may be bypassed.

An integrated thermal management system for a fuel cell electric vehicle may comprise a fuel cell system, a brake resistor, a fuel cell coolant loop comprising a fuel cell radiator thermally and fluidly coupled to the fuel cell system, a brake resistor coolant loop comprising a brake resistor radiator thermally and fluidly coupled to the brake resistor, and a heat exchanger loop comprising a coolant-coolant heat exchanger thermally and fluidly coupled to the fuel cell coolant loop and the brake resistor coolant loop. In a brake resistor cooling operating mode, heat may be transferred from the brake resistor to an ambient environment through the brake resistor radiator and the fuel cell radiator.

In various embodiments, the fuel cell coolant loop may comprise a first coolant and the brake resistor coolant loop may comprise a second coolant. In the brake resistor cooling operating mode, heat may be transferred from the second coolant to the ambient environment through the brake resistor radiator. In the brake resistor cooling operating mode, heat may be transferred from the second coolant to the first coolant in the coolant-coolant heat exchanger. In the brake resistor cooling operating mode, heat may be transferred from the first coolant to the ambient environment through the fuel cell radiator. The integrated thermal management system may further comprise an HVAC coolant loop thermally and fluidly coupled to the brake resistor coolant loop. In the brake resistor cooling operating mode, the HVAC coolant loop may be bypassed. The brake resistor radiator may be positioned upstream from the coolant-coolant heat exchanger. The fuel cell radiator may be positioned downstream from the coolant-coolant heat exchanger.

An integrated thermal management system for a fuel cell electric vehicle may comprise a fuel cell system, a brake resistor, a fuel cell coolant loop comprising a fuel cell radiator thermally and fluidly coupled to the fuel cell system, an HVAC coolant loop comprising a cabin heater core configured to provide heat to a vehicle cabin, and a heat exchanger loop comprising a coolant-coolant heat exchanger thermally and fluidly coupled to the fuel cell coolant loop and HVAC coolant loop. In a cabin heating operating mode, heat may be transferred from the fuel cell system and the brake resistor to the vehicle cabin through the cabin heater core. In the cabin heating operating mode, the fuel cell radiator may be bypassed.

In various embodiments, the integrated thermal management system further comprises a brake resistor coolant loop thermally and fluidly coupled to the heat exchanger loop and the HVAC coolant loop. The brake resistor coolant loop may comprise a brake resistor radiator. In the cabin heating operating mode, the brake resistor radiator may be bypassed.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
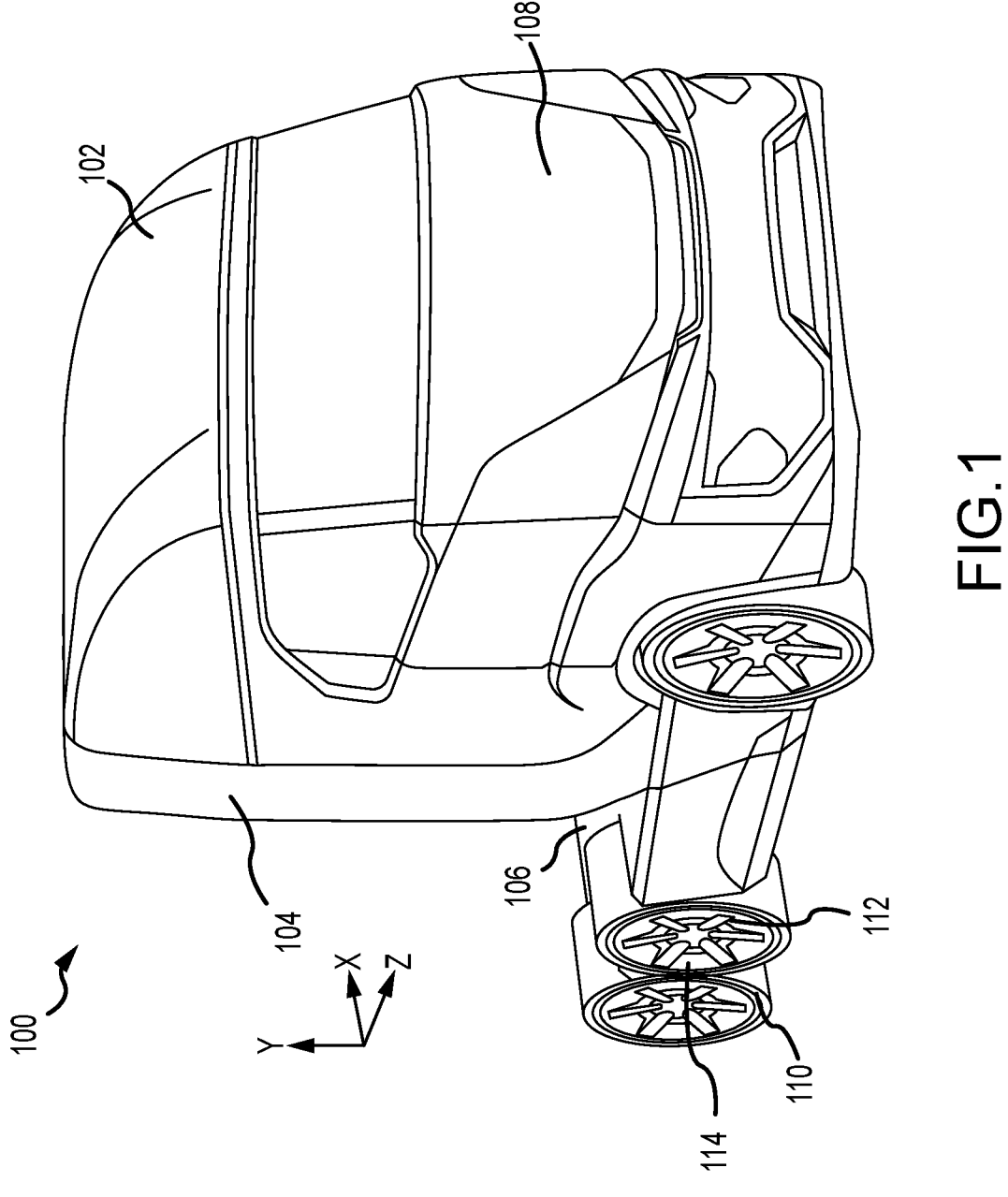
FIG. 1 illustrates a perspective view of an FCEV comprising an integrated thermal management system, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems, methods, and articles may find particular use in connection with FCEVs, battery electric vehicles (including hybrid electric vehicles), compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a fuel cell, brake resistor, and thermal management system of the same. As such, numerous applications of the present disclosure may be realized.

Modern electric vehicles utilize various power sources to provide electric current to one or more electric motors configured to drive the vehicle's wheels. Among the types of electric vehicles being researched and developed at a wide scale are FCEVs, particularly for heavy-duty applications.

Similar to traditional internal combustion engine vehicles (ICEVs), FCEVs generate large amounts of heat through the operation of various systems. Among the systems that generate heat are the fuel cell system, which generates heat as a result of exothermic chemical reactions taking place in fuel cell catalyst layers, and the braking system, which generates heat due to friction in the case of friction braking systems and resistive heating in the case of regenerative braking systems. Traditionally, heat generated by the fuel cell system and the braking system was disposed of using discrete thermal management systems for the fuel cell and the braking system, respectively. However, integrating these thermal management systems can result in numerous benefits, namely, increased thermal efficiency, reduced part count, and reduced system complexity. Increasing thermal efficiency can result in increased range as less power is required to operate the thermal systems and instead can be used to power the electric motor(s). Reducing part count not only reduces costs but also can help reduce the space occupied by the thermal systems. Finally, reducing thermal system complexity can lead to greater vehicle uptime because the number of potential failure points and the time associated with maintenance and service tasks can be reduced.

While integrating the fuel cell thermal management system with thermal management systems of other systems/components can result in numerous benefits, doing so can present certain challenges. For example, because the fuel cell system relies on the generation of electric potential in order to provide power to the vehicle drivetrain and other power consumers, the introduction of ions into the system can lead to current leakage, short circuiting, and/or reduced power output. One of the ways ions can be introduced to the fuel cell system is through the coolant, which can become increasingly conductive due to leaching, degradation, and corrosion of system materials and formation of organic acids resulting from the degradation of the coolant itself. As a result, these issues are desirably addressed when integrating a fuel cell system into a thermal management system that also manages other vehicle systems/components.

Accordingly, with reference to FIG. 1, a perspective view of a vehicle 100 incorporating an integrated thermal management system is illustrated, in accordance with various embodiments. In various embodiments, vehicle 100 is an electric vehicle incorporating an electric powertrain. More specifically, vehicle 100 may be an electric commercial vehicle, such as, for example, a class 8 heavy-duty commercial vehicle. Vehicle 100 may be an FCEV, a battery electric vehicle (BEV), or any other vehicle comprising an energy source, a braking system, and a cabin utilizing thermal management. Moreover, vehicle 100 may comprise a commercial vehicle of a different weight class or a passenger vehicle in various embodiments. While discussed primarily herein as comprising an electric vehicle with an electric drivetrain, it should be appreciated that vehicle 100 may comprise any vehicle type in need of thermal management, including ICEVs of various sizes and applications.

Vehicle 100 comprises a body 102 which defines a cabin 104 configured to contain at least one passenger. For example, cabin 104 may comprise one or more seats, sleepers, or other features configured to provide comfort to an operator or other passenger. Vehicle 100 comprises a heating, ventilation, and air conditioning (HVAC) system which may provide clean air, heat, and cooling to cabin 104 depending on the ambient temperature where vehicle 100 is operating. While illustrated herein as comprising a cabover style body, body 102 is not limited in this regard and may comprise an American style or other style of body.

Vehicle 100 further comprises a battery system 106. Battery system 106 may be a rechargeable, or secondary, battery configured to store electrical energy from an external power source (for example, a charging station), from a fuel cell stack, from a solar panel disposed on vehicle 100, and/or from regenerative braking or other applications. Battery system 106 may release this stored electrical energy to power one or more electric motors and/or to supply power to other vehicle components requiring electricity to operate. In various embodiments, battery system 106 may be a lithium-ion battery, however, battery system 106 is not limited in this regard and may comprise other rechargeable battery types such as a lead-acid battery, nickel-cadmium battery, nickel-metal hydride battery, lithium iron sulfate battery, lithium iron phosphate battery, lithium sulfur battery, solid state battery, flow battery, or any other type of suitable battery. Battery system 106 may further comprise multiple battery cells coupled in series and/or parallel to increase voltage and/or current. The cells of battery system 106 may comprise any suitable structure including cylindrical cells, prismatic cells, or pouch cells. Moreover, battery system 106 may at least partially comprise other energy storage technologies such as an ultracapacitor.

In various embodiments, in addition to battery system 106, vehicle 100 comprises a fuel cell system 108. Fuel cell system 108 may comprise one or more fuel cells capable of facilitating an electrochemical reaction to produce an electric current. For example, the one or more fuel cells may be proton-exchange membrane (PEM) fuel cells which may receive a fuel source (such as diatomic hydrogen gas) which may react with an oxidizing agent (such as oxygen) to generate electricity with heat and water as byproducts. The fuel cells may be electrically coupled in series and/or parallel to increase voltage and/or current and form one or more fuel cell stacks, which together form fuel cell system 108. In various embodiments, fuel cell system 108 may comprise fuel cells other than PEM fuel cells, for example, alkaline fuel cells, phosphoric acid fuel cells, molten carbonate fuel cells, solid oxide fuel cells, or any other suitable fuel cell type.

Battery system 106 and fuel cell system 108 may be configured to collectively or individually provide power to one or more electric motors in order to drive one or more wheels 110 of vehicle 100. For example, in various embodiments, vehicle 100 comprises an electric axle or eAxle 112 containing one or more electric motors and a gear assembly configured to provide torque to a drive shaft. Electric current may be delivered to the electric motor(s) via battery system 106 and/or fuel cell system 108. For example, in various embodiments, fuel cell system 108 may charge battery system 106 and battery system 106 may provide electric current to eAxle 112. Alternatively, fuel cell system 108 may provide electrical power directly to eAxle 112. In various embodiments, vehicle 100 comprises a 6×2 configuration with a single drive axle and two powered wheel ends, however, is not limited in this regard and may comprise any suitable configuration, for example a 4×2, 6×4, 6×6, or other suitable configuration.

Vehicle 100 further comprises a braking system 114 with a brake assembly coupled to one or more of the wheel ends of vehicle 100. In various embodiments, braking system 114 comprises a regenerative braking system, a friction braking system, or a combination thereof. As vehicle 100 decelerates, the electric motor(s) in eAxle 112 may act as generators and convert kinetic energy to electrical energy to charge or recharge battery system 106. When battery system 106 is fully charged or unable to accept the amount of power generated by the regenerative braking system, some of the electrical energy may be dissipated as heat in one or more brake resistors. Dissipating excess electrical energy as heat may help prevent damage to certain system components (such as the electric motor) in response to large power spikes. Without thermal management, the brake resistors can overheat, and the vehicle must instead rely on the use of the friction braking system in order to slow the vehicle. Accordingly, thermal management of braking system 114 (and brake resistors therein) is desirable.

Figure 2:
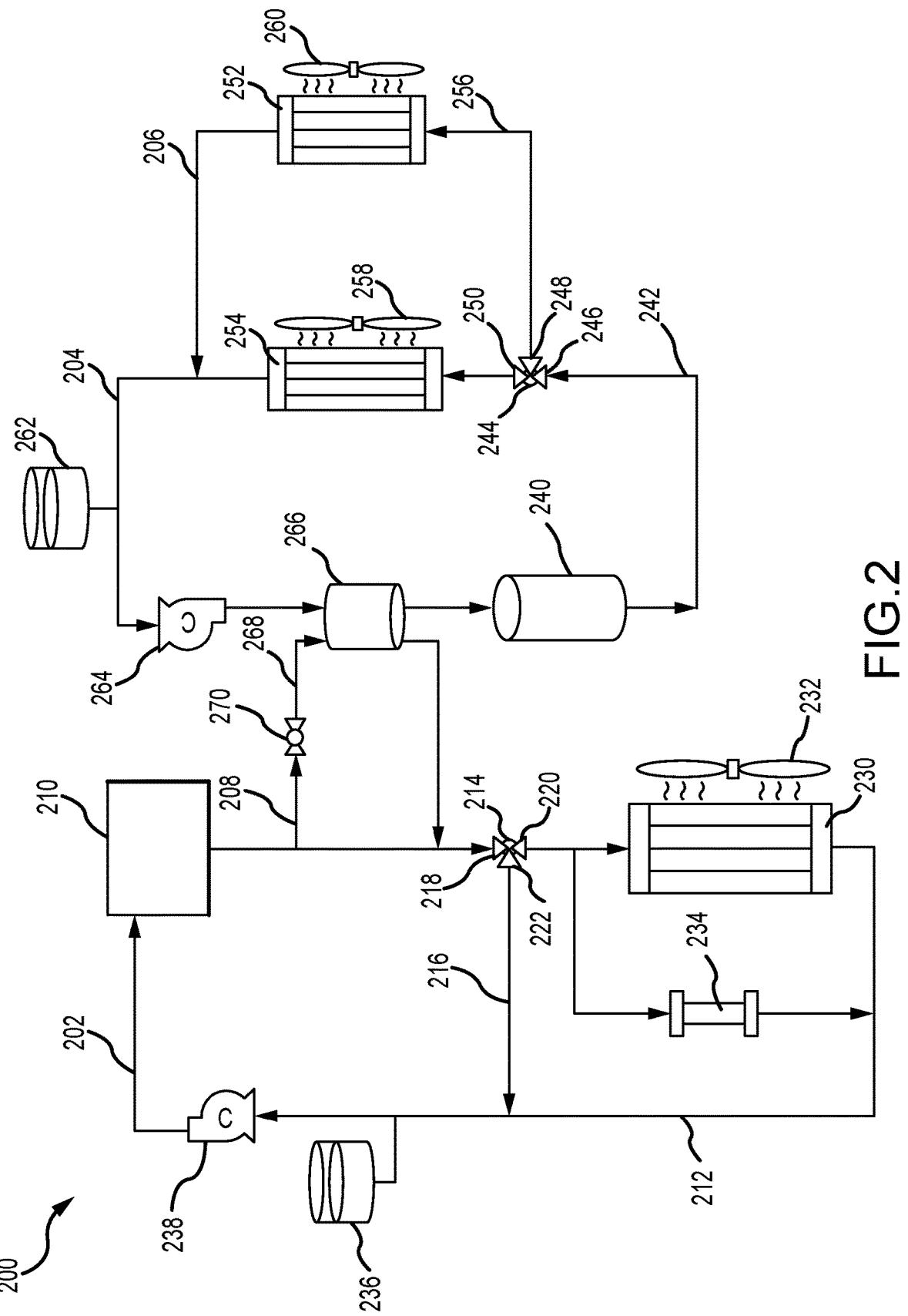
FIG. 2 illustrates an integrated thermal management system, in accordance with various embodiments.

With reference to FIG. 2, an integrated thermal management system 200 of vehicle 100 is illustrated, in accordance with various embodiments. In various embodiments, integrated thermal management system 200 comprises a fuel cell coolant loop 202, a brake resistor coolant loop 204, an HVAC coolant loop 206, and a heat exchanger loop 208. Fuel cell coolant loop 202, brake resistor coolant loop 204, HVAC coolant loop 206, and heat exchanger loop 208 may be thermally and fluidly coupled together to form integrated thermal management system 200. In general, integrated thermal management system 200 may be capable of: cooling a fuel cell system of fuel cell coolant loop 202, heating a fuel cell system of fuel cell coolant loop 202, cooling a brake resistor of brake resistor coolant loop 204, and heating a cabin of the vehicle through HVAC coolant loop 206. While discussed herein as comprising a fuel cell coolant loop 202, a brake resistor coolant loop 204, and an HVAC coolant loop 206, it should be appreciated more or fewer coolant loops may be included in integrated thermal management system 200 (for example, a powertrain coolant loop, a battery coolant loop, and/or an electronics coolant loop). Moreover, in various embodiments, integrated thermal management system 200 may also comprise one or more refrigeration loops, such as one or more vapor-compression refrigeration loops configured to provide additional cooling capacity to the systems or components of vehicle 100. Additionally, while labeled "fuel cell coolant loop," it should be appreciated that fuel cell coolant loop 202 could be configured to thermally manage any heat generating, power delivering system with or without a fuel cell system (such as a battery system or internal combustion engine). Moreover, while labeled "brake resistor coolant loop," it should be appreciated that brake resistor coolant loop 204 could be configured to thermally manage any heat generating braking system or component with or without a brake resistor (such as a friction braking system).

Fuel cell coolant loop 202 is configured to provide heat to or remove heat from a fuel cell system 210 (which may be the same as fuel cell system 108 described in relation to FIG. 1) depending on ambient temperatures and operating conditions. For example, in various embodiments, fuel cell system 210 is thermally and fluidly coupled to the other components of fuel cell coolant loop 202 via a fuel cell coolant line 212. Fuel cell coolant line 212 may be configured to contain a first coolant configured to absorb and transfer heat. In various embodiments, the first coolant in fuel cell coolant loop 202 comprises a chemically inert fluid having a high thermal capacity and a relatively low viscosity. The first coolant may comprise a gaseous fluid such as air, helium, or other inert gas, or may comprise a liquid fluid such as water, ethylene glycol, propylene glycol, betaine, polyalkylene glycol, or other suitable coolant. As discussed above, too much conductivity in the first coolant for fuel cell system 210 may adversely impact fuel cell performance and/or longevity, so deionized coolant such as water or water/glycol mixture may be desirable. Moreover, increased coolant conductivity could decrease the isolation resistance of the vehicle, thereby creating a safety hazard for persons interacting with the vehicle such as operators, service technicians, and/or first responders. In various embodiments, the first coolant of fuel cell coolant loop 202 comprises additives such as non-ionic corrosion inhibitors and/or ion-suppressing compounds such as ion-exchange nanoparticles. The first coolant of fuel cell coolant loop 202 may comprise a conductivity of less than 10 μS/cm, a conductivity of less than 5 μS/cm, or a conductivity of less than 2 μS/cm in various embodiments.

Fuel cell coolant loop 202 further comprises a first bypass valve 214. First bypass valve 214 is downstream of and thermally and fluidly coupled to fuel cell system 210 via fuel cell coolant line 212. In various embodiments, first bypass valve 214 comprises a diverting valve such as a three-way valve, for example. Stated otherwise, first bypass valve 214 may comprise three openings, including one inlet and two outlets. First bypass valve 214 is configured to receive the first coolant from fuel cell system 210 through inlet 218 and, depending on an operating mode, deliver the first coolant through first outlet 220 (to a fuel cell radiator as will be discussed in further detail below), deliver the first coolant through second outlet 222 (to bypass the fuel cell radiator as will be discussed in further detail below), or deliver a portion of the first coolant through first outlet 220 and deliver a portion of the first coolant through second outlet 222. In various embodiments, first bypass valve 214 may be configured with multiple positions to adjust the amount of the first coolant that is directed through first outlet 220 and second outlet 222, respectively. In various embodiments, first bypass valve 214 is configured with 90 discrete positions, however, first bypass valve 214 is not limited in this regard and may comprise a valve configured with more or fewer positions.

Fuel cell coolant loop 202 further comprises a fuel cell radiator 230 downstream of and thermally and fluidly coupled to first bypass valve 214 via fuel cell coolant line 212. Fuel cell coolant loop 202 may further comprise one or more T connectors or Y connectors downstream of first bypass valve 214 and upstream of fuel cell radiator 230. Depending on an operating mode, the first coolant may be configured to flow through first outlet 220 of first bypass valve 214, into an inlet of fuel cell radiator 230, and out of an outlet of fuel cell radiator 230. Fuel cell radiator 230 may be configured to transfer heat stored in the first coolant (resulting from the transfer of heat from fuel cell system 210 to the first coolant, for example) to an external environment (for example, the ambient environment external to vehicle 100). While illustrated as comprising a single radiator, fuel cell radiator 230 is not limited in this regard and may comprise two or more radiators coupled in series and/or parallel. Fuel cell radiator 230 may comprise internal, serpentine tubing configured to contain and route the first coolant and one or more fins (or similar structures) that are configured to increase surface area. As heated coolant flows through the tubing of fuel cell radiator 230, heat may be transferred to the external environment via (or primarily via) convective heat transfer. As a result, the first coolant may be cooled as it flows through fuel cell radiator 230. In various embodiments, fuel cell radiator 230 is equipped with a fan 232, which may assist in convective heat transfer to the external environment. However, in various embodiments, fuel cell radiator 230 is devoid of a fan and instead utilizes air flowing into and/or around vehicle 100 to assist in heat transfer, which may reduce power consumption resulting from operation of the fan.

In various embodiments, fuel cell coolant loop 202 further comprises an ion exchanger 234 downstream of and thermally and fluidly coupled to first bypass valve 214 via fuel cell coolant line 212. Depending on the operating mode, the first coolant may be configured to flow through first outlet of first bypass valve 214, into an inlet of ion exchanger 234, and out of an outlet of ion exchanger 234. Ion exchanger 234 may be configured to reduce the conductivity of the first coolant as the first coolant passes through ion exchanger 234. In various embodiments, ion exchanger 234 comprises a cartridge housing comprising a resin having a mixed bed of negatively charged anions and positively charged cations. The mixed bed may be configured with any suitable anion/cation ratio, for example, 1:1, 2:1, 1:2, or other desired ratio. As the first coolant travels through ion exchanger 234, anions in the first coolant may react with cations in ion exchanger 234 and cations in the first coolant may react with anions in ion exchanger 234. As a result, the conductivity of the first coolant may be reduced. The first coolant flowing through ion exchanger 234 may be reintroduced to fuel cell coolant line 212 downstream of ion exchanger 234, for example via a T connector or Y connector.

In various embodiments, fuel cell coolant loop 202 comprises a T connector or Y connector upstream of fuel cell radiator 230 and ion exchanger 234. The T connector or Y connector may permit the first coolant coming from first bypass valve 214 to be split into two flow paths, with a first flow path being configured to flow through fuel cell radiator 230 and a second flow path being configured to flow through ion exchanger 234. As a result, at least a portion of the first coolant may continually be deionized by being passed through ion exchanger 234. The two flow paths may recombine downstream of fuel cell radiator 230 and ion exchanger 234 through the use of another T connector or Y connector.

Alternatively, fuel cell coolant loop 202 may be configured such that, depending on an operating mode, all of the first coolant is passed through fuel cell radiator 230 or all of the first coolant is passed through ion exchanger 234. For example, in various embodiments, the T connector or Y connector upstream of fuel cell radiator and ion exchanger 234 may be replaced with a bypass valve configured to permit or prevent flow to fuel cell radiator 230 or ion exchanger 234. Fuel cell coolant loop 202 may default to passing the first coolant through fuel cell radiator 230 rather than ion exchanger 234. For example, in various embodiments, the bypass valve may be configured such that a first outlet (to fuel cell radiator 230) is normally open and a second outlet (to ion exchanger 234) is normally closed. As a result, absent some signal (for example, a controller area network (CAN) signal) indicating an instruction to pass the first coolant through ion exchanger 234, the first coolant is passed through fuel cell radiator 230 instead of ion exchanger 234. In various embodiments, integrated thermal management system 200 may be configured such that the first coolant is passed through ion exchanger 234 at predetermined time increments (for example, at vehicle startup or shutdown, once a minute, once an hour, once a day, and so on) or in response to a measured conductivity of the first coolant exceeding a threshold value (for example, >2 μS/cm, >5 μS/cm, >10 μS/cm). In various embodiments, fuel cell coolant loop 202 further comprises a conductivity sensor that may be placed in any suitable position in fuel cell coolant loop 202, such as on an expansion tank, downstream of fuel cell system 210, downstream of first bypass valve 214, or upstream and/or downstream of ion exchanger 234. Moreover, while illustrated being thermally and fluidly connected in parallel, fuel cell coolant loop 202 is not limited in this regard and fuel cell radiator 230 and ion exchanger 234 may be thermally and fluidly coupled in series with ion exchanger 234 immediately upstream or downstream of fuel cell radiator 230 in various embodiments. Coupling fuel cell radiator 230 and ion exchanger 234 in parallel as opposed to series can reduce and/or minimize a pressure drop in fuel cell coolant line 212.

Fuel cell coolant loop 202 further comprises a first expansion tank 236 downstream of and thermally and fluidly coupled to first bypass valve 214, fuel cell radiator 230, and ion exchanger 234. Depending on an operating mode, first expansion tank 236 may be configured to receive the first coolant directly from first bypass valve 214, fuel cell radiator 230, or ion exchanger 234. For operating modes in which fuel cell radiator 230 and ion exchanger 234 are bypassed, the first coolant may be directed out of second outlet 222 of first bypass valve 214. A T connector or Y connector may fluidly couple together a bypass line 216 connected to the second outlet 222 of first bypass valve 214 and fuel cell coolant line 212. First expansion tank 236 may be configured to protect fuel cell coolant loop 202 by removing excess pressure resulting from heated coolant. For example, as the first coolant travels throughout fuel cell coolant loop 202, the first coolant may absorb heat from various systems, including fuel cell system 210, and the temperature of the first coolant may elevate despite heat transfer taking place in fuel cell radiator 230 or other system component. As the first coolant expands with an increase in temperature, first expansion tank 236 may be configured to accommodate the pressure increase to avoid exceeding a threshold pressure limit of fuel cell coolant loop 202 and/or prevent undesired venting of the first coolant. In various embodiments, first expansion tank 236 comprises a compression expansion tank, bladder expansion tank, diaphragm expansion tank, or any other suitable expansion tank type.

In various embodiments, fuel cell coolant loop 202 further comprises a first pump 238 that may be downstream of first expansion tank 236 and upstream of fuel cell system 210. Similar to all other components or systems of fuel cell coolant loop 202, first pump 238 is thermally and fluidly coupled to first expansion tank 236 and fuel cell system 210 via fuel cell coolant line 212. First pump 238 may be configured to circulate the first coolant throughout fuel cell coolant loop 202. First pump 238 may comprise any suitable fluid pump such as a centrifugal pump, diaphragm pump, gear pump, peripheral pump, reciprocating pump, rotary pump, or other suitable pump.

With continued reference to FIG. 2, as discussed above, integrated thermal management system 200 further comprises brake resistor coolant loop 204, which may be configured to manage and/or repurpose heat generated by a brake resistor 240. While discussed herein as being configured to manage heat from brake resistor 240, it should be appreciated that brake resistor coolant loop 204 may be configured to manage heat generated from any braking system or component, such as other brake system electronics or friction brakes, for example. Brake resistor 240 may be thermally and fluidly coupled to every other component/system of brake resistor coolant loop via a brake resistor coolant line 242. Brake resistor coolant line 242 contains a second coolant configured to absorb and transfer heat. In various embodiments, the second coolant in brake resistor coolant loop 204 may be the same as or different from the first coolant in fuel cell coolant loop 202. Using separate coolants in brake resistor coolant loop 204 and fuel cell coolant loop 202 can reduce, minimize, and/or limit the conductivity of the coolant passing through fuel cell system 210 because ions generated by the components of brake resistor coolant loop 204 are isolated from fuel cell coolant loop 202.

In various embodiments, brake resistor 240 is thermally and fluidly coupled to a second bypass valve 244 via brake resistor coolant line 242. Similar to first bypass valve 214, second bypass valve 244 comprises a diverting valve such as a three-way valve. In various embodiments, second bypass valve 244 comprises a single inlet and two outlets. For example, second bypass valve 244 may comprise an inlet 246 configured to receive the second coolant from brake resistor 240, a first outlet 248 configured to deliver the second coolant to a cabin heater core 252 of HVAC coolant loop 206 via an HVAC coolant line 256, and a second outlet 250 configured to deliver the second coolant to a brake resistor radiator 254 via brake resistor coolant line 242. Depending on an operating mode, second bypass valve 244 may be configured to deliver the second coolant only to cabin heater core 252 and prevent the second coolant from flowing to brake resistor radiator 254, may be configured to deliver the second coolant only to brake resistor radiator 254 and prevent the second coolant from flowing to cabin heater core 252, or may be configured to deliver a portion of the second coolant to brake resistor 254 and deliver a portion of the second coolant to cabin heater core 252. In various embodiments, second bypass valve 244 may be configured with multiple positions to adjust the amount of the first coolant that is directed through first outlet 248 and second outlet 250, respectively. In various embodiments, second bypass valve 244 is configured with 90 discrete positions, however, second bypass valve 244 is not limited in this regard and may comprise a valve configured with more or fewer positions.

Brake resistor radiator 254 may be substantially similar to fuel cell radiator 230 in various embodiments. Brake resistor radiator 254 may be configured to transfer heat stored in the second coolant (resulting from the transfer of heat from brake resistor 240 to the second coolant, for example) to the external environment (for example, the ambient environment external to vehicle 100). While illustrated as comprising a single radiator, brake resistor radiator 254 is not limited in this regard and may comprise two or more radiators coupled in series and/or parallel. Brake resistor radiator 254 may comprise internal, serpentine tubing configured to contain and route the second coolant and one or more fins (or similar structures) that are configured to increase surface area. As heated coolant flows through the tubing of brake resistor radiator 254, heat may be transferred to the external environment via (or primarily via) convective heat transfer. As a result, the second coolant may be cooled as it flows through brake resistor radiator 254. In various embodiments, brake resistor radiator 254 is equipped with a fan 258, which may assist in convective heat transfer to the external environment. However, in various embodiments, brake resistor radiator 254 is devoid of a fan and instead utilizes air flowing into and/or around vehicle 100 to assist in heat transfer, which may reduce power consumption resulting from operation of the fan.

In various embodiments, cabin heater core 252 may be substantially similar to fuel cell radiator 230 and brake resistor radiator 254. However, rather than transferring heat to the external environment, cabin heater core 252 may be configured to transfer heat in the second coolant to cabin 104. While illustrated as comprising a single heater core, cabin heater core 252 is not limited in this regard and may comprise two or more heater cores coupled in series and/or parallel. Cabin heater core 252 may comprise internal, serpentine tubing configured to contain and route the second coolant and one or more fins (or similar structures) that are configured to increase surface area. As heated coolant flows through the tubing of cabin heater core 252, heat may be transferred to cabin 104 (or primarily via) convective heat transfer. As a result, the second coolant may be cooled as it flows through cabin heater core 252. In various embodiments, cabin heater core 252 is equipped with a fan 260, which may assist in convective heat transfer to cabin 104. However, in various embodiments, cabin heater core 252 is devoid of a fan and instead utilizes air flowing into and/or around vehicle 100 to assist in heat transfer, which may reduce power consumption resulting from operation of the fan.

HVAC coolant line 256 and brake resistor coolant line 242 are thermally and fluidly coupled together downstream of cabin heater core 252 and brake resistor radiator 254. For example, depending on the operating mode, the second coolant may flow into an inlet of brake resistor radiator 254, out of an outlet of brake resistor radiator 254, and continue to flow through brake resistor coolant line 242. Alternatively, the second coolant may flow into an inlet of cabin heater core 252, out of an outlet of cabin heater core 252, and continue to flow through HVAC coolant line 256. A fluid fitting such as a T connector or Y connector may fluidly couple together brake resistor coolant line 242 and HVAC coolant line 256.

In various embodiments, brake resistor coolant loop 204 further comprises a second expansion tank 262 downstream of and thermally and fluidly coupled to brake resistor radiator 254 and cabin heater core 252. In various embodiments, second expansion tank 262 and first expansion tank 236 may be identical to one another; in other embodiments, second expansion tank 262 and first expansion tank 236 may differ in one or more characteristics (for example, size, shape, volume, and/or the like). Second expansion tank 262 may be configured to protect brake resistor coolant loop 204 and/or HVAC coolant loop 206 by removing excess pressure resulting from heated coolant. For example, as the second coolant travels throughout brake resistor coolant loop 204 and/or HVAC coolant loop 206, the second coolant may absorb heat from various systems, including brake resistor 240, and the temperature of the second coolant may elevate despite heat transfer taking place in brake resistor radiator 254 or cabin heater core 252. As the second coolant expands with an increase in temperature, second expansion tank 262 may be configured to accommodate the pressure increase to avoid exceeding a threshold pressure limit of brake resistor coolant loop 204 or HVAC coolant loop 206 and/or prevent undesired venting of the second coolant. In various embodiments, second expansion tank 262 comprises a compression expansion tank, bladder expansion tank, diaphragm expansion tank, or any other suitable expansion tank type. In various embodiments, brake resistor coolant loop 204 further comprises a second pump 264 downstream of and thermally and fluidly coupled to second expansion tank 262. Second pump 264 and first pump 238 may be identical to one another; in other embodiments, second pump 264 and first pump 238 may differ in one or more characteristics (e.g., power draw, flow rate, type of pump, size, shape, and/or the like). Second pump 264 may be configured to circulate the first coolant throughout brake resistor coolant loop 204 and/or HVAC coolant lop 206. Second pump 264 may comprise any suitable fluid pump such as a centrifugal pump, diaphragm pump, gear pump, peripheral pump, reciprocating pump, rotary pump, or other suitable pump.

As briefly discussed above, integrated thermal management system 200 further comprises a heat exchanger loop 208. In various embodiments, integrated thermal management system 200 comprises a coolant-coolant heat exchanger 266 downstream of and thermally and fluidly coupled to second pump 264 of brake resistor coolant loop 204. Coolant-coolant heat exchanger 266 is further thermally and fluidly coupled to fuel cell coolant loop 202 via a heat exchanger line 268. Coolant-coolant heat exchanger 266 may be configured to exchange heat between the first coolant in fuel cell coolant loop 202 and the second coolant in brake resistor coolant loop 204. For example, depending on the operating mode, heat stored in the first coolant may be transferred to the second coolant as the first coolant and second coolant flow through coolant-coolant heat exchanger 266. Alternatively, depending on the operating mode, heat stored in the second coolant may be transferred to the first coolant as the first coolant and second coolant flow through coolant-coolant heat exchanger 266. As a result, waste heat generated by one system or component (for example, fuel cell system 210 or brake resistor 240) may be repurposed and used to heat another system or component depending on operating conditions.

Coolant-coolant heat exchanger 266 may comprise any suitable heat exchanger type. For example, in various embodiments, coolant-coolant heat exchanger 266 comprises a single-phase heat exchanger having any suitable structure. Coolant-coolant heat exchanger 266 may comprise a shell and tube heat exchanger, gasketed plate heat exchanger, welded plate heat exchanger, spiral plate heat exchanger, lamella heat exchanger, plate and fin heat exchanger, tube fin heat exchanger, heat pipe heat exchanger, double pipe heat exchanger, or any other suitable type of heat exchanger. Moreover, coolant-coolant heat exchanger 266 may be configured with any suitable flow arrangement for the first coolant and the second coolant. For example, in various embodiments, coolant-coolant heat exchanger 266 is a cocurrent flow heat exchanger, countercurrent flow heat exchanger, crossflow heat exchanger, or hybrid (cross and counterflow) heat exchanger.

In various embodiments, heat exchanger loop 208 further comprises a shutoff valve 270 downstream of and thermally and fluidly coupled to fuel cell system 210 and upstream of and thermally and fluidly coupled to coolant-coolant heat exchanger 266. While discussed herein as being positioned upstream of coolant-coolant heat exchanger 266, heat exchanger loop 208 is not limited in this regard and shutoff valve 270 may be positioned downstream of coolant-coolant heat exchanger 266 or anywhere on heat exchanger line 268. In various embodiments, shutoff valve 270 is a normally closed or a normally open electronic shutoff valve. Depending on the operating mode, shutoff valve 270 may be configured to receive the first coolant from fuel cell coolant loop 202 and allow the first coolant to flow to coolant-coolant heat exchanger 266 or may be configured to prevent the first coolant from flowing to coolant-coolant heat exchanger 266. In various embodiments, the position of shutoff valve 270 (as well as the positions of first bypass valve 214, second bypass valve 244, and speeds of various pumps and fans) may be determined based on communication signals (for example, CAN signals) sent by an onboard thermal management module. In various embodiments, fuel cell coolant loop 202 and heat exchanger coolant loop 208 are thermally and fluidly coupled together via one or more T connectors or Y connectors which may fluidly couple together fuel cell coolant line 212 and heat exchanger line 268.

Figure 3A:
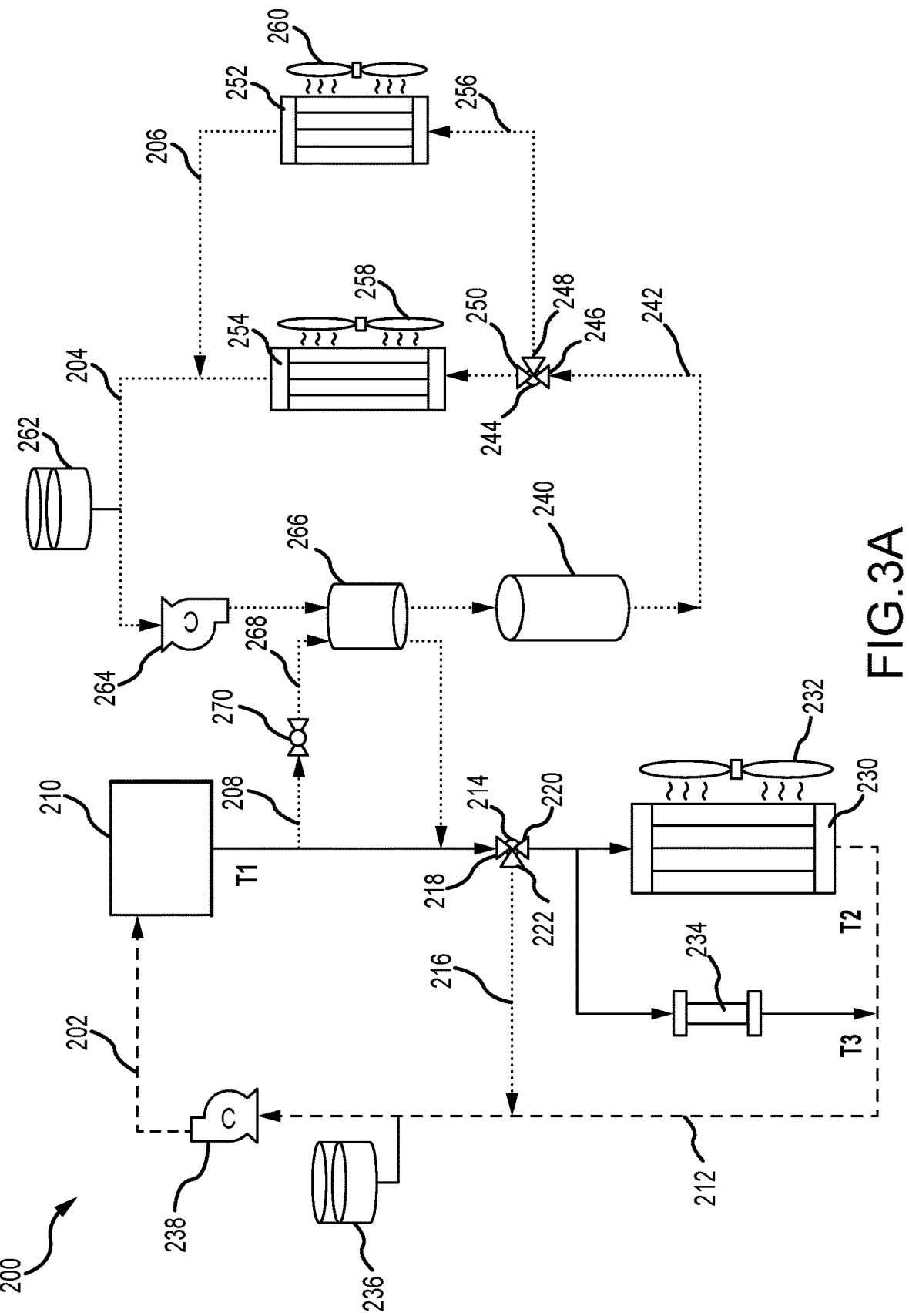
FIGS. 3A-3C illustrate fuel cell cooling operating modes of an integrated thermal management system, in accordance with various embodiments.
Figure 3B:
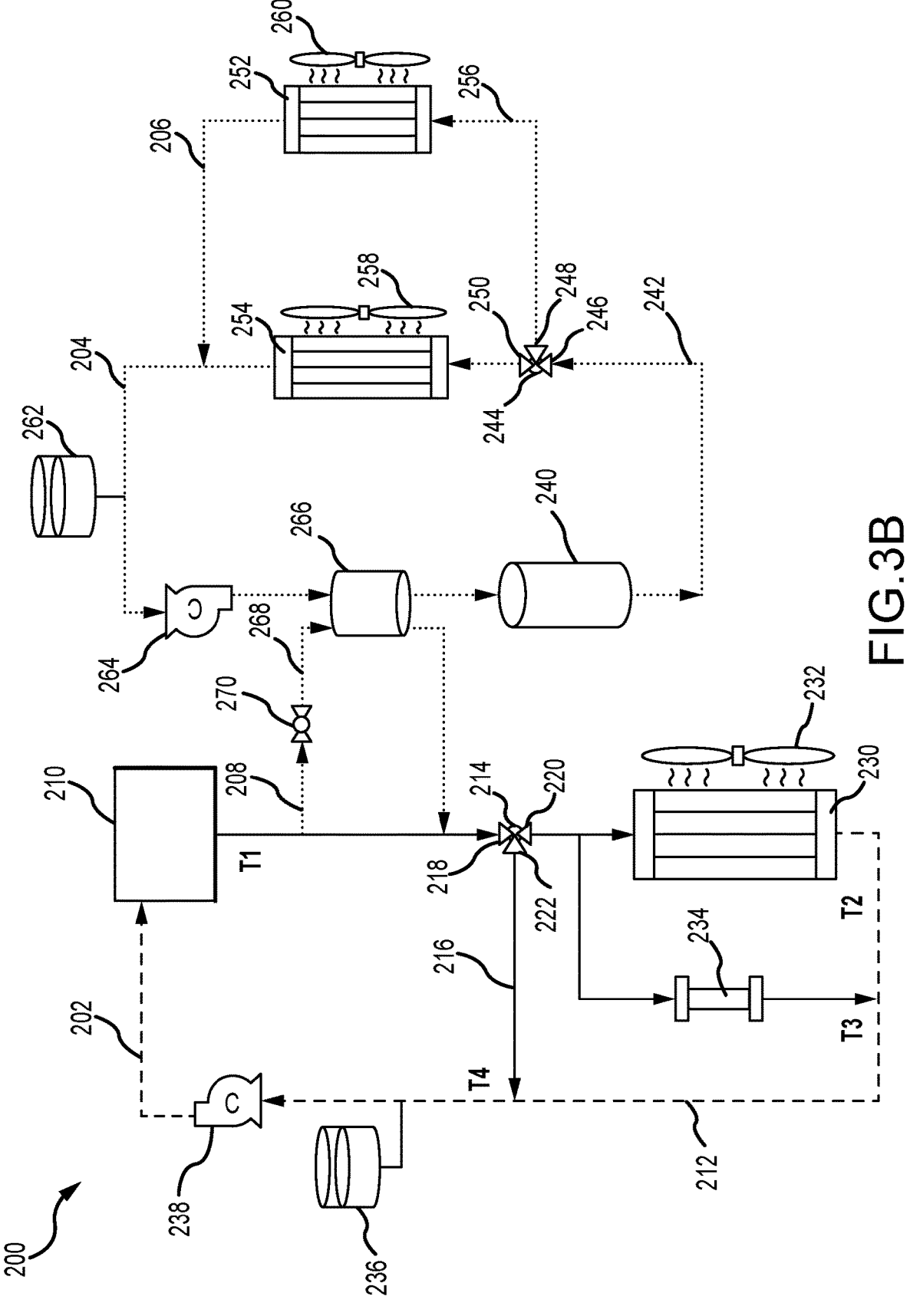
Figure 3C:
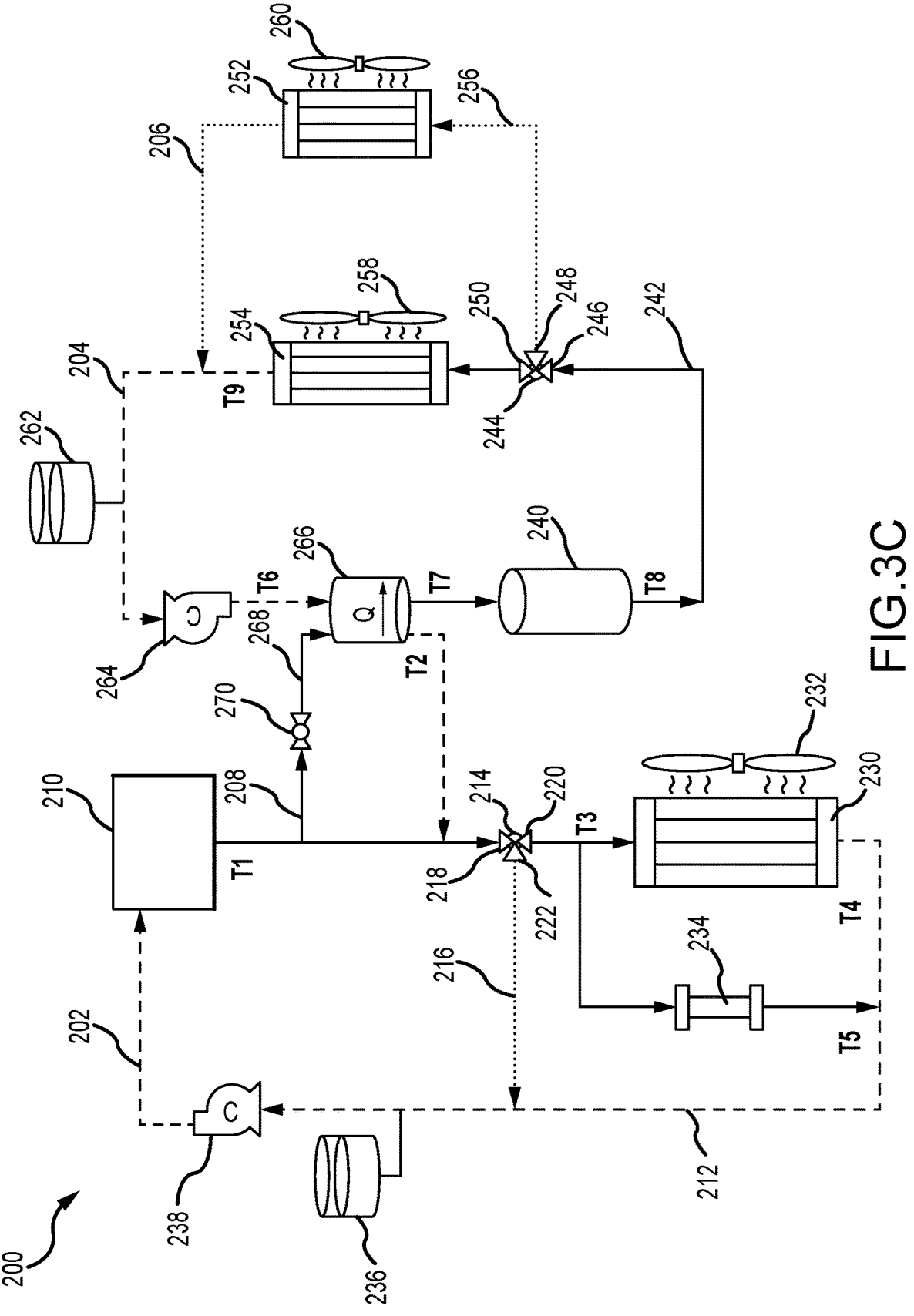

With reference now to FIG. 3A, FIG. 3B, and FIG. 3C, integrated thermal management system 200 is illustrated in a first fuel cell cooling operating mode, a second fuel cell cooling operating mode, and a third fuel cell cooling operating mode, respectively, in accordance with various embodiments. The first fuel cell cooling operating mode and the second fuel cell cooling operating mode may be utilized for warm ambient conditions (for example, temperatures up to 40° C.) or for conditions in which the first coolant becomes warm as a result of heat transfer from fuel cell system 210 to the first coolant. The third fuel cell cooling operating mode may be utilized for hot ambient conditions (for example, temperatures greater than 40° C.) or for conditions in which the first coolant becomes hot as a result of heat transfer from fuel cell system 210 to the first coolant. Moreover, the third fuel cell cooling operating mode may be useful for aging fuel cell systems that generate more heat for a given power output as a result of cell degradation. As illustrated throughout, solid lines indicate lines actively circulating relatively warm coolant, dashed lines indicate lines actively circulating relatively cool coolant, and dotted lines indicate lines not actively circulating coolant. Moreover, as illustrated throughout, temperatures of the first coolant and second coolant are designated as T1-T12 to permit discussion of relative temperature differences of the coolants at various points in various operating modes.

With attention to FIG. 3A, in the first fuel cell cooling operating mode, brake resistor coolant loop 204 is off and fuel cell coolant loop 202 is in radiator mode. As fuel cell system 210 operates and generates heat, first pump 238 is turned on in order to circulate the first coolant to cool fuel cell system 210. As the first coolant flows through fuel cell system 210, the first coolant becomes heated and is suitable to be cooled. In the first fuel cell cooling operating mode, shutoff valve 270 of heat exchanger loop 208 is closed, so all of the first coolant is directed to first bypass valve 214. First bypass valve 214 receives the first coolant through inlet 218 and directs all of the first coolant through first outlet 220 toward fuel cell radiator 230. Fuel cell radiator 230 transfers heat in the first coolant to the external environment, thereby cooling the first coolant. The first coolant can then be recycled through fuel cell coolant loop 202 to provide further cooling to fuel cell system 210. The remaining loops of integrated thermal management system 200 are off in the first fuel cell cooling operating mode. As illustrated, in the first fuel cell cooling operating mode, T1 may be greater than T3, which may be greater than T2.

With attention to FIG. 3B, in the second fuel cell cooling operating mode, brake resistor coolant loop 204 is off and fuel cell coolant loop 202 is in mixed mode. The second fuel cell cooling operating mode may be utilized in situations in which fuel cell system 210 utilizes cooling but passing all of the first coolant through fuel cell radiator 230 could result in excessive cooling of the first coolant based on the cooling needs of fuel cell system 210. As a result, in the second fuel cell cooling operating mode, only a portion of the first coolant is passed through fuel cell radiator 210 to transfer heat to the external environment. In the second fuel cell cooling operating mode, first bypass valve 214 is positioned such that a first portion of the first coolant is directed through first outlet 220 (to fuel cell radiator 230 and ion exchanger 234) and a second portion of the first coolant is directed through second outlet 222 (to bypass line 216). As discussed above, first bypass valve 214 may be configured with multiple positions to enable the first coolant to be directed through first outlet 220 and second outlet 222 at any desired ratio. As illustrated, in the second fuel cell cooling operating mode, T1 may be greater than T4, which may be greater than T3, which may be greater than T2.

With attention to FIG. 3C, in the third fuel cell cooling operating mode, both fuel cell coolant loop 202 and brake resistor coolant loop 204 are in radiator mode. For example, in the third fuel cell cooling operating mode, both first pump 238 and second pump 264 are on such that the first coolant and second coolant are circulated throughout fuel cell coolant loop 202 and brake resistor coolant loop 204, respectively. In contrast to the first fuel cell cooling operating mode and the second fuel cell cooling operating mode, in the third fuel cell cooling operating mode, shutoff valve 270 is open to permit at least a portion of the first fuel cell coolant to flow through heat exchanger loop 208. Stated otherwise, in the third fuel cell cooling operating mode, a first portion of the first coolant is directed through fuel cell coolant line 212 and a second portion of the first coolant is directed through heat exchanger line 268. Similar to the first fuel cell cooling operating mode, heat generated by fuel cell system 210 is transferred to the first coolant and the first coolant may be passed through inlet 218 of first bypass valve 214, out of first outlet 220 of first bypass valve 214, and into fuel cell radiator 230 where it is transferred to the external environment. In various embodiments, the first portion and the second portion are delivered with substantially similar (+/10%) mass flow rates; however, integrated thermal management system 200 is not limited in this regard and the first portion and second portion may be delivered at any suitable ratio, for example, a 2:1 ratio, a 1:2 ratio, a 3:1 ratio, a 1:3 ratio, a 4:1 ratio, a 1:4 ratio, or other suitable ratio (the same may be true for any other operating mode utilizing coolant-coolant heat exchanger 266).

The second portion of the first coolant, which may also be at an elevated temperature due to heat transfer from fuel cell system 210 to the first coolant, passes through shutoff valve 270 and enters coolant-coolant heat exchanger 266. At the same time the heated second portion of the first coolant travels through coolant-coolant heat exchanger 266, the relatively cooler second coolant of brake resistor coolant loop 204 also passes through coolant-coolant heat exchanger 266. As the second portion of the first coolant and the second coolant travel through coolant-coolant heat exchanger 266, heat is transferred from the second portion of the first coolant to the second coolant, thereby heating the second coolant and cooling the second portion of the first coolant. The second portion of the first coolant then recombines with the first portion of the first coolant downstream of coolant-coolant heat exchanger 266 and continues on to first bypass valve 214 and fuel cell radiator 230.

After passing through coolant-coolant heat exchanger 266, the second coolant in brake resistor coolant loop 204 passes through brake resistor 240. Depending on braking use and state of charge (SOC) of the battery system of vehicle 100, brake resistor 240 may also be at an elevated temperature and may transfer heat to the second coolant as the second coolant passes through brake resistor 240. In the third fuel cell cooling operating mode, second bypass valve 244 is positioned such that the second coolant is able to flow out of second outlet 250 but prevented from flowing out of first outlet 248. As a result, in the second fuel cell cooling operating mode, cabin heater core 252 is bypassed and instead the second coolant flows through brake resistor radiator 254. At brake resistor radiator 254, heat in the second coolant is transferred to the external environment and the second coolant may be recycled throughout brake resistor coolant loop 204 to provide further cooling for the first coolant of fuel cell coolant loop 202 (and therefore for fuel cell system 210). As illustrated, in the third fuel cell cooling operating mode, T1 may be greater than T3, which may be greater than T2, T4, and T5. In various embodiments, T5 may be greater than T4, and depending on the amount of heat transfer in coolant-coolant heat exchanger 266 and fuel cell radiator 230, T2 may be greater than T5 and T4, between T5 and T4, less than T5 and T4, or substantially equal to T5 or T4. Additionally, T8 may be greater than or substantially equal to T7, which may be greater than T6, which may be substantially equal to T9.

Figure 4A:
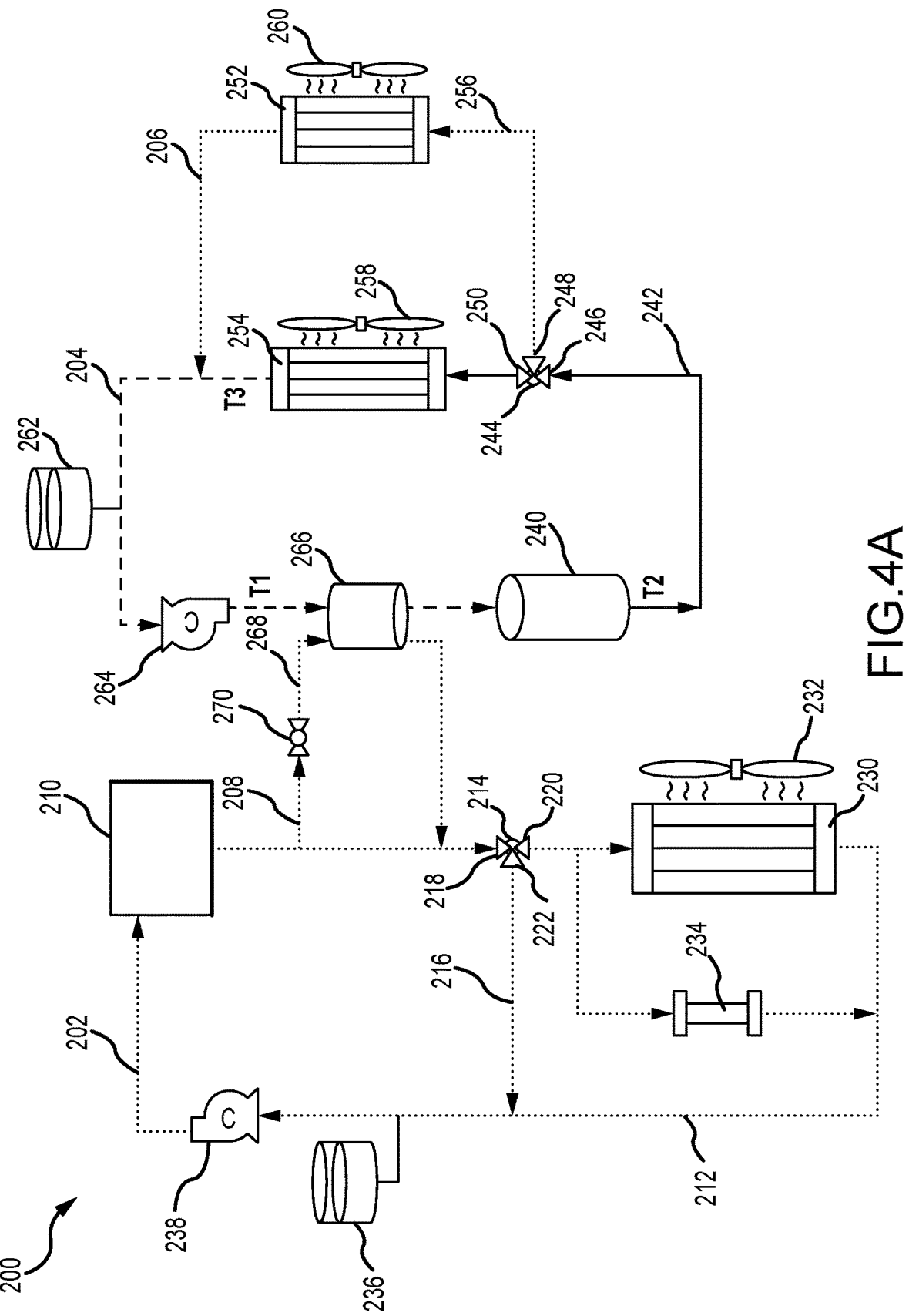
FIGS. 4A-4C illustrate brake resistor cooling operating modes of an integrated thermal management system, in accordance with various embodiments.
Figure 4B:
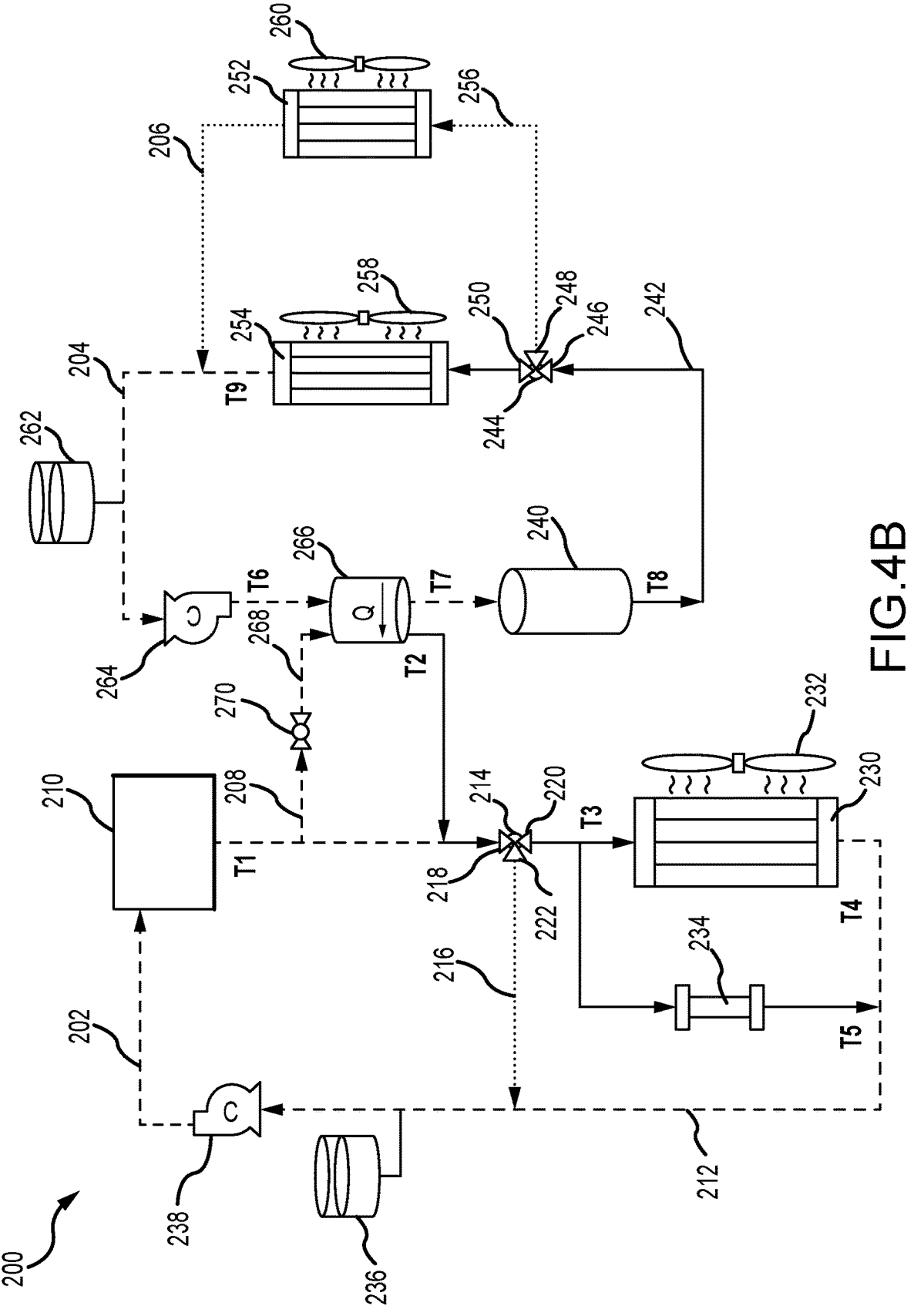
Figure 4C:
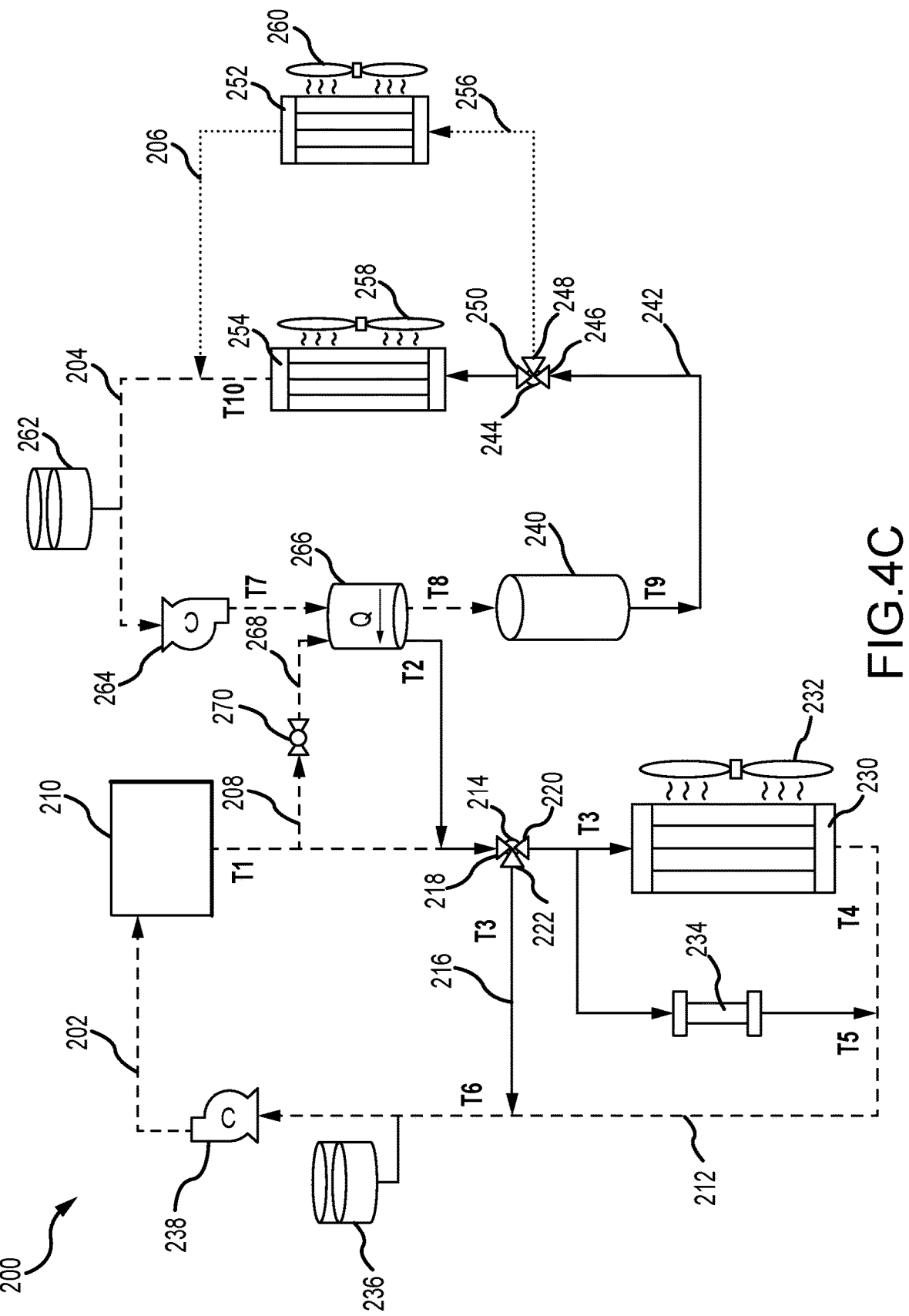

With reference to FIG. 4A, FIG. 4B, and FIG. 4C, integrated thermal management system 200 is illustrated in a first brake resistor cooling operating mode, a second brake resistor cooling operating mode, and a third brake resistor cooling operating mode, respectively, in accordance with various embodiments. The first brake resistor cooling operating mode, second brake resistor cooling operating mode, and third brake resistor cooling operating mode may be utilized when brake resistor 240 generates large amounts of heat due to reduced regenerative functionality, for example. More specifically, if battery system 106 of vehicle 100 is fully charged (or nearly fully charged), energy generated from the electric motors during braking may no longer be able to be used to charge battery system 106 and thus may desirably be dissipated as heat through brake resistor 240. This situation commonly occurs when battery system 106 is fully charged and vehicle 100 descends a hill or other sloped terrain, but can also occur during abrupt braking events which can generate large voltage spikes. In either case, the first brake resistor cooling operating mode, second brake resistor cooling operating mode, and third brake resistor cooling operating mode are configured to cool brake resistor 240 to prevent damage to the same. Cooling of brake resistor 240 may also be utilized during warm ambient conditions or when the second coolant is at an elevated temperature.

With attention to FIG. 4A, in the first brake resistor cooling operating mode, fuel cell coolant loop 202 is off and brake resistor coolant loop 204 is in radiator mode. As the second coolant is pumped through coolant-coolant heat exchanger 266 and through brake resistor 240, heat in brake resistor 240 is transferred to the second coolant, thereby cooling brake resistor 240 and heating the second coolant. In the first brake resistor cooling operating mode, second bypass valve 244 is positioned such that the second coolant is permitted to flow through second outlet 250 but prevented from flowing through first outlet 248. As a result, the second coolant is directed to brake resistor radiator 254 where heat in the second coolant is transferred to the external environment, thereby cooling the second coolant. After exiting brake resistor radiator 254, the second coolant is recycled throughout brake resistor coolant loop 204 to provide further cooling for brake resistor 240. As illustrated, in the first brake resistor cooling operating mode, T2 may be greater than T1, which may be substantially equal to T3.

With attention to FIG. 4B, in the second brake resistor cooling operating mode, both fuel cell coolant loop 202 and brake resistor coolant loop 204 are in radiator mode. The second brake resistor cooling operating mode may be used in situations where power demand from fuel cell system 210 is reduced or not utilized (such as during regenerative braking) and brake resistor 240 utilizes additional cooling. In the second brake resistor cooling operating mode, brake resistor coolant loop 204 operates in the same manner as the first brake resistor cooling operating mode. However, in contrast to the first brake resistor cooling operating mode, in the second brake resistor cooling operating mode, additional heat exchange takes place in coolant-coolant heat exchanger 266.

More specifically, after exiting brake resistor radiator 254, the second coolant may be relatively warmer than the first coolant despite heat transfer from the second coolant to the external environment in brake resistor radiator 254. The first coolant may be relatively cooler than the second coolant due to the reduced power output of fuel cell system 210, which reduces the amount of heat transferred from fuel cell system 210 to the first coolant. In the second brake resistor cooling operating mode, the relatively warmer second coolant and the relatively cooler first coolant are passed through coolant-coolant heat exchanger 266 simultaneously. For example, in the second brake resistor cooling operating mode, shutoff valve 270 is opened, thereby permitting the second portion of the first coolant to flow through heat exchanger loop 208 while the first portion of the first coolant continues to first bypass valve 214. As the second portion of the first coolant and the second coolant pass through coolant-coolant heat exchanger 266, the relatively warmer second coolant transfers heat to the relatively cooler second portion of the first coolant, thereby warming the second portion of the first coolant.

After exiting coolant-coolant heat exchanger 266, the warmed second portion of the first coolant recombines with the first portion of the first coolant and is transferred to the external environment. More specifically, in the second brake resistor cooling operating mode, first bypass valve is positioned such that the first coolant is permitted to flow through first outlet 220 but prevented from flowing through second outlet 222. As a result, the first coolant flows through fuel cell radiator 230 to enable further heat transfer to the external environment. After exiting fuel cell radiator 230, the first coolant is recycled throughout fuel cell coolant loop 202 to enable further cooling for brake resistor 240 (and/or fuel cell system 210 to the extent utilized). As illustrated, in the second brake resistor cooling operating mode, T2 may be greater than T3, which may be greater than T1, which may be greater than T5, which may be greater than T4. Additionally, T8 may be greater than T6, which may be substantially equal to T9, which may be greater than T7.

With attention to FIG. 4C, in the third brake resistor cooling operating mode, brake resistor coolant loop 204 is in radiator mode and fuel cell coolant loop is in mixed mode. The third brake resistor cooling operating mode may be utilized in situations in which brake resistor 240 utilizes additional cooling capacity through fuel cell radiator 230 but passing all of the first coolant through fuel cell radiator 230 could result in excessive cooling of the first coolant based on the cooling needs of fuel cell system 210. As a result, in the third brake resistor cooling operating mode, only a portion of the first coolant is passed through fuel cell radiator 210 to transfer heat to the external environment. In the third brake resistor cooling operating mode, first bypass valve 214 is positioned such that a first portion of the first coolant is directed through first outlet 220 (to fuel cell radiator 230 and ion exchanger 234) and a second portion of the first coolant is directed through second outlet 222 (to bypass line 216). As discussed above, first bypass valve 214 may be configured with multiple positions to enable the first coolant to be directed through first outlet 220 and second outlet 222 at any desired ratio. As illustrated, in the third brake resistor cooling operating mode, T2 may be greater than T3, which may be greater than T1, which may be greater than T6, which may be greater than T5, which may be greater than T4. Additionally, T9 may be greater than T7, which may be substantially equal to T10, which may be greater than T8.

Figure 5:
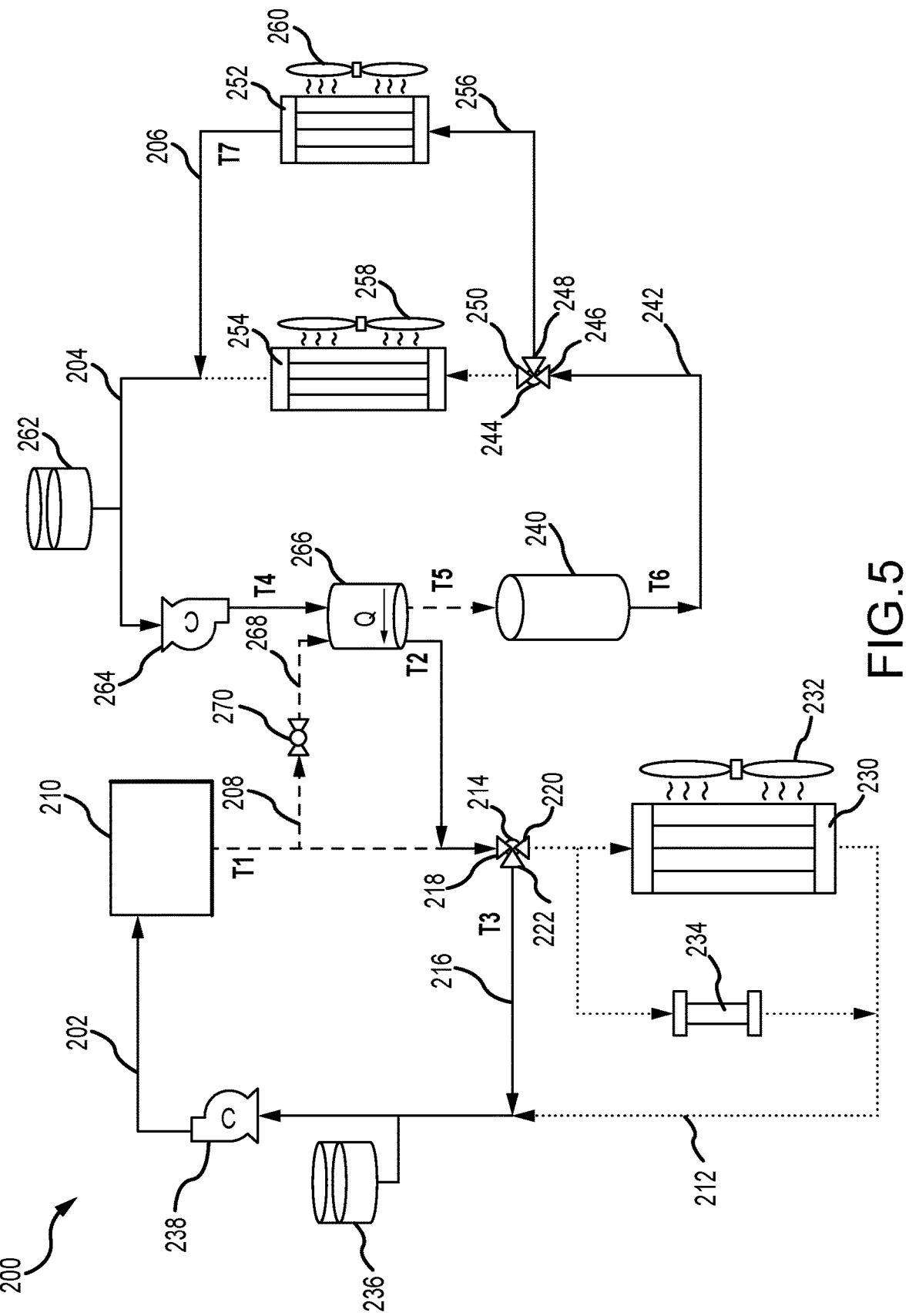
FIG. 5 illustrates a fuel cell heating operating mode of an integrated thermal management system, in accordance with various embodiments.

With reference to FIG. 5, integrated thermal management system 200 is illustrated in a fuel cell heating operating mode, in accordance with various embodiments. The fuel cell heating operating mode may be utilized in situations in which fuel cell system 210 utilizes heating or preconditioning, such as in cold ambient conditions (for example, temperatures less than 5° C.) and where some amount of heat is still salvageable from brake resistor 240. More specifically, in the fuel cell heating operating mode, heat generated by brake resistor 240 can be used to heat fuel cell system 210 without transferring heat to the external environment via fuel cell radiator 230 or brake resistor radiator 254. As such, in the fuel cell heating operating mode, fuel cell coolant loop 202 is in bypass mode and brake resistor coolant loop 204 is in heater mode. Using heat from brake resistor 240 to heat or precondition fuel cell system 210 eliminates the need for a separate electric heat source that can consume energy that can otherwise be used to power vehicle 100.

With attention to brake resistor coolant loop 204 and HVAC coolant loop 206, in the fuel cell heating operating mode, the second coolant enters brake resistor 240 and heat is transferred from brake resistor 240 to the second coolant, thereby warming the second coolant. Following this, the second coolant exits brake resistor 240 and is routed to second bypass valve 244. In the fuel cell heating operating mode, second bypass valve 244 is positioned such that the second coolant is prevented from flowing through second outlet 250 but permitted to flow through first outlet 248. As a result, the second coolant bypasses brake resistor radiator 254 and is instead passed through cabin heater core 252. In various embodiments, fan 260 of cabin heater core 252 is off to minimize the amount of heat transfer to cabin 104 of vehicle 100 and maximize the amount of heat available for heating fuel cell system 210. However, in various embodiments, fan 260 of cabin heater core 252 is on to permit heat transfer to both fuel cell system 210 and cabin 104. After exiting cabin heater core 252, the second coolant continues to flow through HVAC coolant line 256 until it is reintroduced to brake resistor coolant line 242. The second coolant then passes through second pump 264 and into coolant-coolant heat exchanger 266.

With attention to fuel cell coolant loop 202, the first coolant is relatively cool as it exits fuel cell system 210 due to the lack of heat transfer from fuel cell system 210. In the fuel cell heating operating mode, shutoff valve 270 is open, so at least a portion of the first coolant is directed to coolant-coolant heat exchanger 266. As discussed above, when shutoff valve 270 is open, a first portion of the first coolant is directed directly to first bypass valve 214 while a second portion of the first coolant is directed to coolant-coolant heat exchanger 266. As the second portion of the first coolant passes through coolant-coolant heat exchanger 266, the relatively warmer second coolant is also passing through coolant-coolant heat exchanger 266 and transfers heat to the second portion of the first coolant in the process. As a result, the second portion of the first coolant exits heat exchanger loop 208 as a relatively warm fluid that recombines with the first portion of the first coolant in fuel cell coolant line 212.

In contrast to the operating modes discussed above, in the fuel cell heating operating mode, first bypass valve 214 is positioned such that the first coolant is prevented from flowing through first outlet 220 but permitted to flow through second outlet 222. As a result, in the fuel cell heating operating mode, fuel cell radiator 230 is bypassed, thereby preventing heat transfer from the first coolant to the external environment. Instead, the first coolant is passed through bypass line 216 to first pump 238 and from first pump 238 to fuel cell system 210. At fuel cell system 210, heat is transferred from the first coolant to fuel cell system 210 in order to heat or precondition fuel cell system 210. The first coolant then continues to cycle throughout heat exchanger loop 208 and fuel cell coolant loop 202 as described above to continue to heat fuel cell system 210 as required. As illustrated, in the fuel cell heating operating mode, T2 may be greater than T3, which may be greater than T1. Additionally, T6 may be greater than T4, which may be substantially equal to T7, which may be greater than T5.

With reference to FIG. 6A, FIG. 6B, FIG. 6C, and FIG. 6D, integrated thermal management system 200 is illustrated in a first cabin heating operating mode, a second cabin heating operating mode, a third cabin heating operating mode, and a fourth cabin heating operating mode, respectively, in accordance with various embodiments. The various cabin heating operating modes may be utilized in cold ambient conditions (for example, temperatures less than 15° C.) in order to provide comfort for the operator or passengers of vehicle 100. In the first cabin heating operating mode, fuel cell coolant loop 202 is in bypass mode and brake resistor coolant loop 204 is in heater mode. In the second cabin heating operating mode, fuel cell coolant loop 202 is in radiator mode and brake resistor coolant loop 204 is in heater mode. In the third cabin heating operating mode, fuel cell coolant loop 202 is in mixed mode and brake resistor coolant loop 204 is in heater mode. In the fourth cabin heating operating mode, fuel cell coolant loop 202 is off and brake resistor coolant loop 204 is in heater mode. Depending on the cabin heating operating mode, heat generated by fuel cell system 210, brake resistor 240, or both is transferred to cabin 104.

Figure 6A:
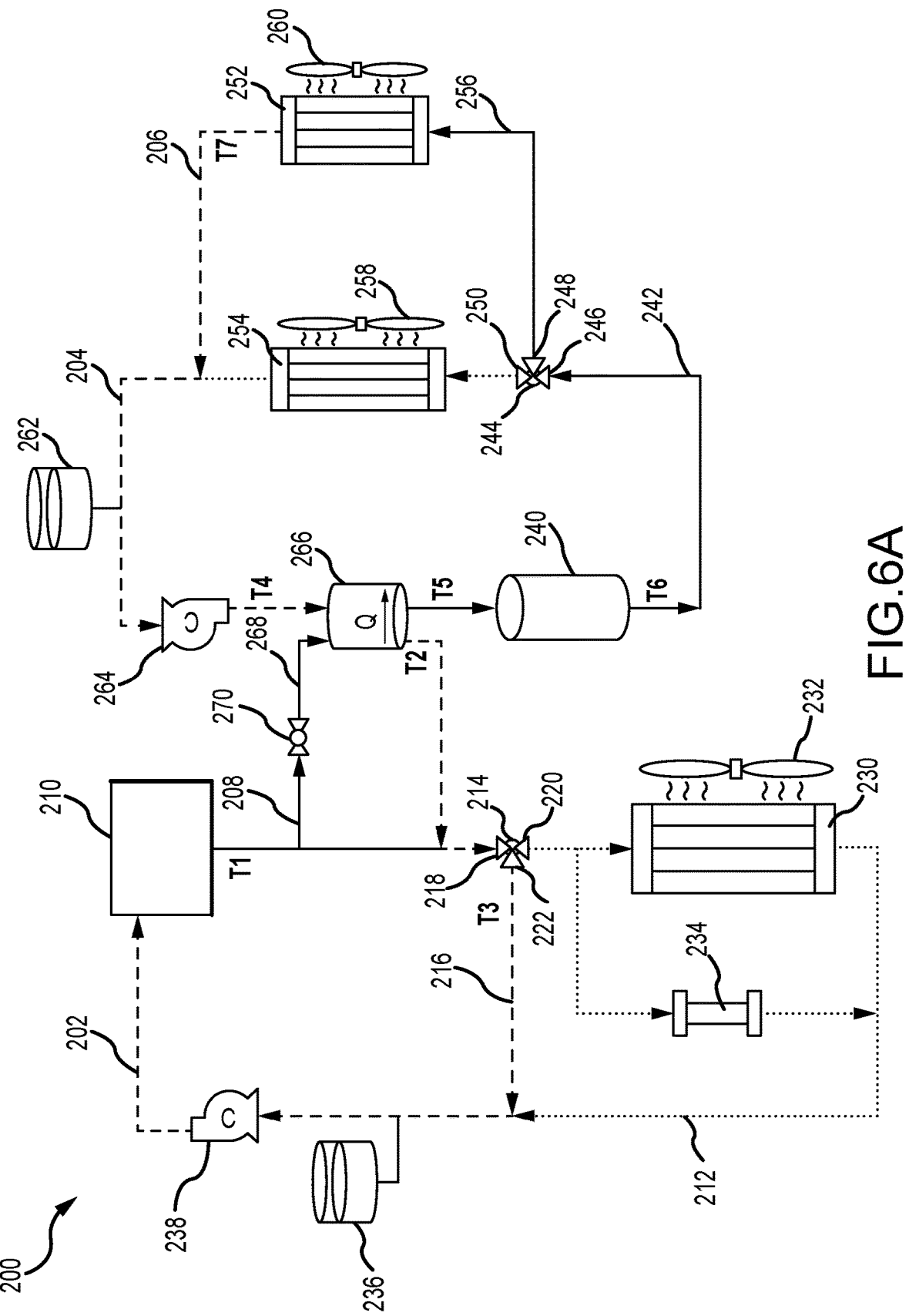
FIGS. 6A-6D illustrate cabin heating operating modes of an integrated thermal management system, in accordance with various embodiments.

With attention to FIG. 6A, in the first cabin heating operating mode, fuel cell system 210 is in operation and therefore generates heat. As the first coolant passes through fuel cell system 210, heat is transferred from fuel cell system 210 to the first coolant, thereby warming the first coolant. In the first cabin heating operating mode, shutoff valve 270 is open to permit at least a portion of the first fuel cell coolant to flow through heat exchanger loop 208. Stated otherwise, in the first cabin heating operating mode, a first portion of the first coolant may be directed through fuel cell coolant line 212 directly to first bypass valve 214 and a second portion of the first coolant may be directed through heat exchanger line 268 to coolant-coolant heat exchanger 266.

As the second portion of the first coolant flows through coolant-coolant heat exchanger 266, heat is transferred from the relatively warmer first coolant to the relatively cooler second coolant. In doing so, the second portion of the first coolant loses heat and exits coolant-coolant heat exchanger 266 as a relatively cooler fluid. After exiting coolant-coolant heat exchanger 266, the second portion of the first coolant recombines with the first portion of the first coolant in fuel cell coolant line 212 and is directed to first bypass valve 214. In the first cabin heating operating mode, sufficient heat is transferred from the first coolant to the second coolant such that fuel cell radiator 230 is bypassed. This can occur for numerous reasons such as when fuel cell system 210 is operating at a low power output, the ambient temperature is very cold, or the temperature gradient between the first coolant and the second coolant is great enough to lead to a large amount of heat transfer from the first coolant to the second coolant. As such, in the first cabin heating operating mode, first bypass valve 214 is positioned such that the first coolant is prevented from flowing through the first outlet 220 but permitted to flow through the second outlet 222. From first bypass valve 214, the first coolant enters bypass line 216 and is recycled throughout fuel cell coolant loop 202 to enable further heat transfer from fuel cell system 210 to the first coolant.

As discussed above, the second portion of the first coolant transfers heat to the second coolant in coolant-coolant heat exchanger 266. After exiting coolant-coolant heat exchanger 266, the second coolant enters brake resistor 240. Depending on a number of factors (such as braking behavior, battery system SOC, ambient temperature, etc.), brake resistor 240 may also be at an elevated temperature and therefore may also transfer heat to the second coolant as the second coolant passes through brake resistor 240. However, in other situations (such as when battery system 106 is capable of receiving power input due to regenerative braking or the ambient temperature is colder), brake resistor 240 does not transfer heat to the second coolant. In either case, the second coolant exits brake resistor 240 and is directed to second bypass valve 244. In the first cabin heating operating mode (and remaining cabin heating operating modes), second bypass valve 244 is positioned such that the second coolant is prevented from flowing through second outlet 250 but permitted to flow through first outlet 248. As such, the second coolant enters cabin heater core 252 and transfers heat to cabin 104 of vehicle 100. After exiting cabin heater core 252, the second coolant travels through HVAC coolant line 256 until it is introduced to brake resistor coolant line 242. The second coolant is then recycled throughout brake resistor coolant loop 204 and HVAC coolant loop 206 to provide additional heat to cabin 104. As illustrated, in the first cabin heating operating mode, T1 may be greater than T3, which may be greater than T2. Additionally, T6 may be greater than T5, which may be greater than T4, which may be substantially equal to T7.

Figure 6B:
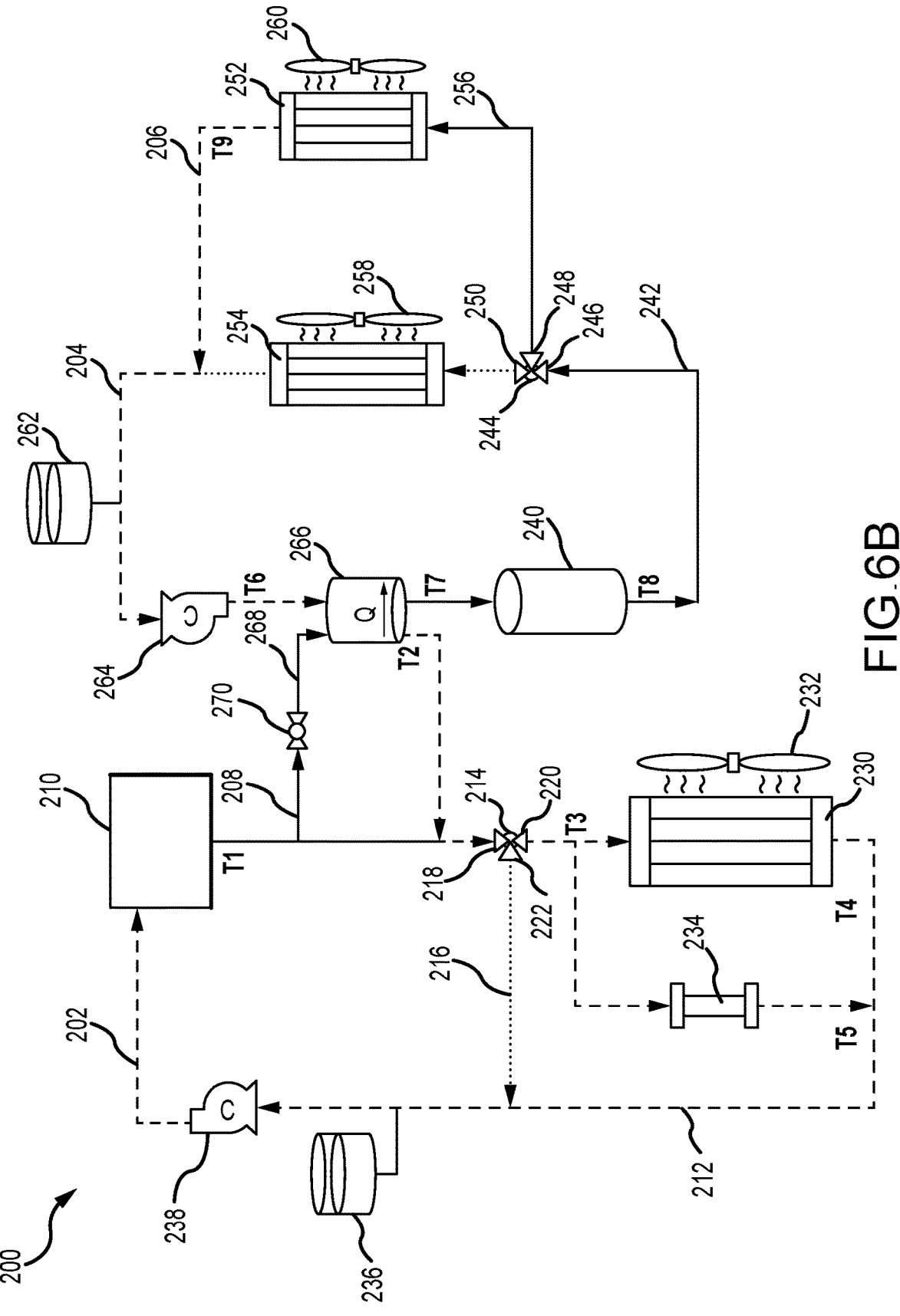

With attention to FIG. 6B, in the second cabin heating operating mode, brake resistor coolant loop 204 (and HVAC coolant loop 206) operates in the same manner as the first cabin heating operating mode so that discussion will not be repeated for the sake of brevity. In contrast to the first cabin heating operating mode, in the second cabin heating operating mode, fuel cell coolant loop 202 is in radiator mode. Under certain operating conditions (such as when fuel cell system 210 is operating at maximum power, brake resistor 240 is generating large amounts of heat, etc.), heat in the first coolant may not be adequately dissipated by transferring the heat to the second coolant. As a result, heat in the first coolant may desirably be dissipated to the external environment via fuel cell radiator 230. Failure to do so could result in the first coolant being at an elevated temperature as power output increases, which could adversely affect the first coolant's ability to cool fuel cell system 210.

As such, in the second cabin heating operating mode, after the second portion of the first coolant exits coolant-coolant heat exchanger 266, the second portion recombines with the first portion of the first coolant and is directed to first bypass valve 214. First bypass valve is positioned such that the first coolant is prevented from flowing through second outlet 222 but permitted to flow through first outlet 220. As a result, the first coolant passes through fuel cell radiator 230 and heat stored in the first coolant is transferred to the external environment. Following this, the first coolant is recycled throughout fuel cell coolant loop 202 to provide further heating for cabin 104. As illustrated, in the second cabin heating operating mode, T1 may be greater than T3, which may be greater than T2, T4, and T5. In various embodiments, T5 may be greater than T4, and depending on the amount of heat transfer in coolant-coolant heat exchanger 266 and fuel cell radiator 230, T2 may be greater than T5 and T4, between T5 and T4, less than T5 and T4, or substantially equal to T5 or T4. Additionally, T8 may be greater than T7, which may be greater than T6, which may be substantially equal to T9.

Figure 6C:
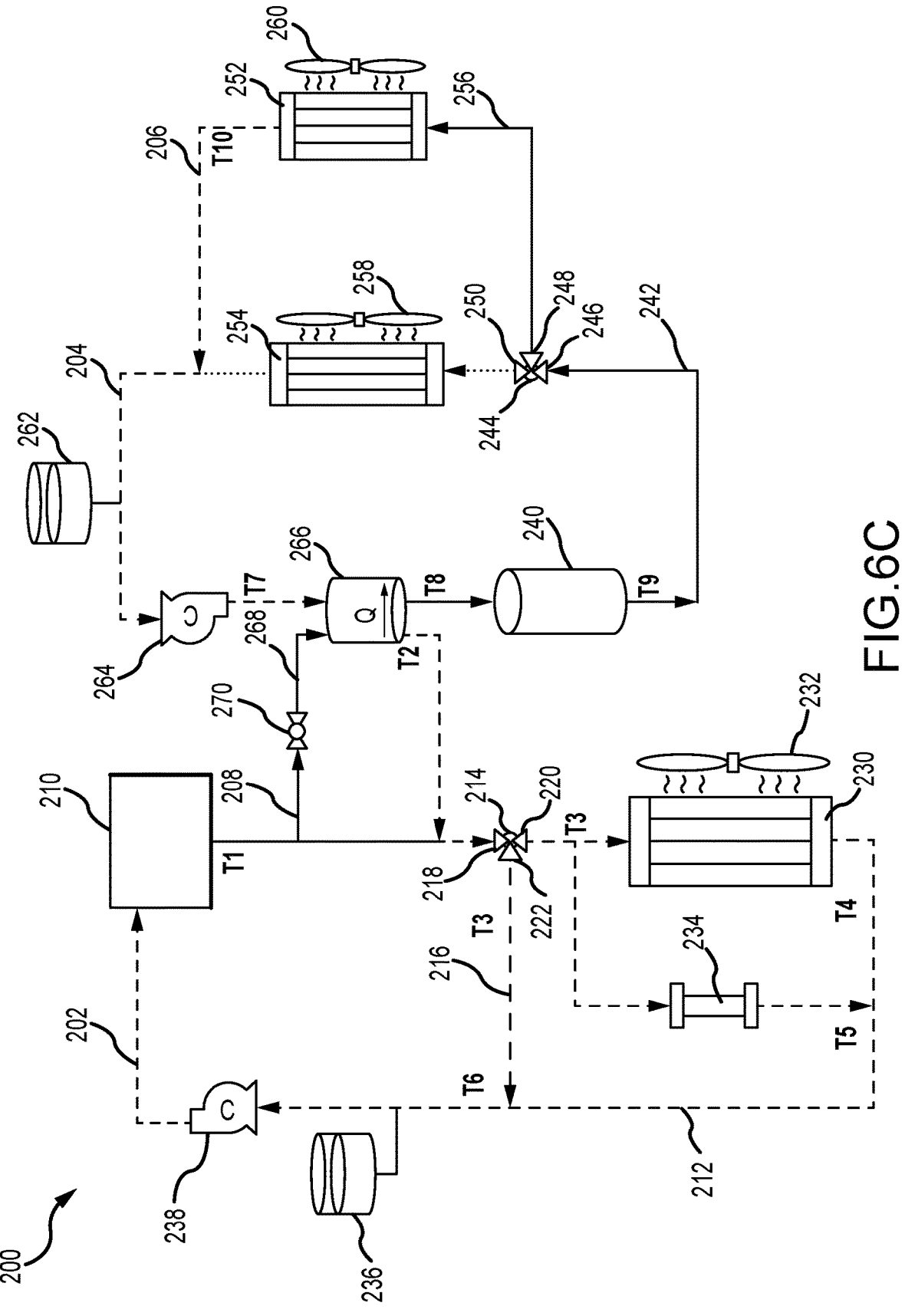

With attention to FIG. 6C, in the third cabin heating operating mode, brake resistor coolant loop 204 is in heater mode and fuel cell coolant loop 202 is in mixed mode. The third cabin heating operating mode may be utilized in situations in which, in addition to providing heat for cabin 104, fuel cell system 210 utilizes cooling but passing all of the first coolant through fuel cell radiator 230 could result in excessive cooling of the first coolant based on the cooling needs of fuel cell system 210. As a result, in the third cabin heating operating mode, only a portion of the first coolant is passed through fuel cell radiator 210 to transfer heat to the external environment. In the third cabin heating operating mode, first bypass valve 214 is positioned such that a first portion of the first coolant is directed through first outlet 220 (to fuel cell radiator 230 and ion exchanger 234) and a second portion of the first coolant is directed through second outlet 222 (to bypass line 216). As discussed above, first bypass valve 214 may be configured with multiple positions to enable the first coolant to be directed through first outlet 220 and second outlet 222 at any desired ratio. As illustrated, in the third cabin heating operating mode, T1 may be greater than T3, which may be greater than T6, which may be greater than T5, which may be greater than T4. In various embodiments, T3 may be greater than T2. Depending on the amount of heat transfer in coolant-coolant heat exchanger 266 and fuel cell radiator 230, T2 may be greater than T6, T5, and T4, between any of T6, T5, and T4, less than T6, T5, and T4, or substantially equal to T6, T5, or T4. Additionally, T9 may be greater than T8, which may be greater than T7, which may be substantially equal to T10.

Figure 6D:
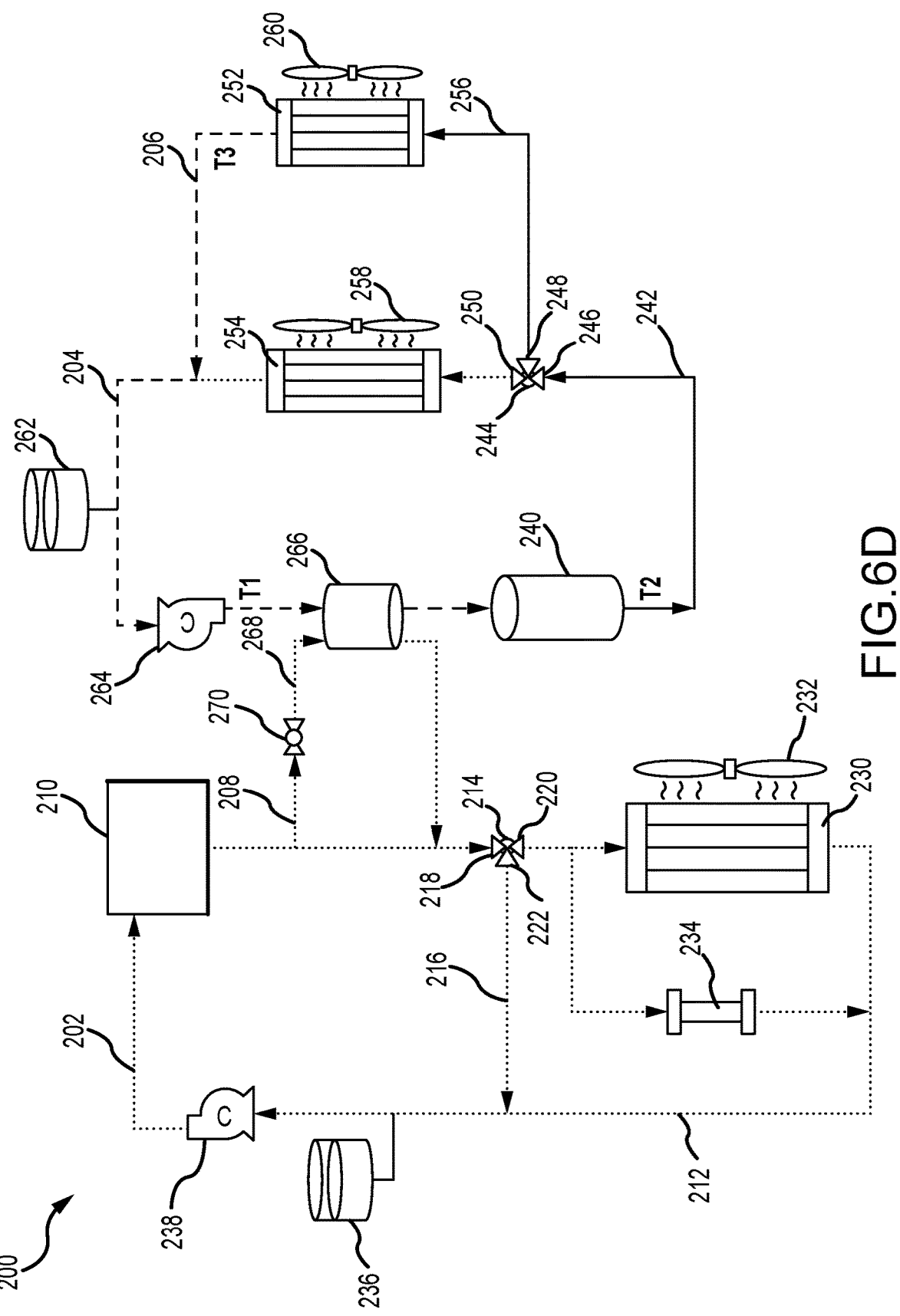

With attention to FIG. 6D, in the fourth cabin heating operating mode, fuel cell coolant loop 202 is off and brake resistor coolant loop 204 is in heater mode. As a result, all of the heat provided to cabin 104 is provided by brake resistor 240. More specifically, in the fourth cabin heating operating mode, the second coolant pumped by second pump 264 enters coolant-coolant heat exchanger 266 as a relatively cool fluid. Because fuel cell coolant loop 202 is off, no heat is transferred between the first coolant and the second coolant in coolant-coolant heat exchanger 266. After exiting coolant-coolant heat exchanger 266, the second coolant is passed through brake resistor 240 and heat is transferred from brake resistor 240 to the second coolant, thereby warming the second coolant. From brake resistor 240, the second coolant is directed to second bypass valve 244. In the fourth cabin heating mode, second bypass valve 244 is positioned such that the second coolant is prevented from flowing through second outlet 250 but permitted to flow through first outlet 248. As such, the second coolant is directed to cabin heater core 252 from second bypass valve 244 where heat is transferred from the second coolant to cabin 104. After exiting cabin heater core 252, the second coolant is directed through HVAC coolant line 256 until it reenters brake resistor coolant line 242. The second coolant is then recycled throughout brake resistor coolant loop 204 (and HVAC coolant loop 206) to provide further cooling for brake resistor 240 and to provide further heating for cabin

104. As illustrated, in the fourth cabin heating operating mode, T2 may be greater than T1, which may be substantially equal to T3.

Figure 7A:
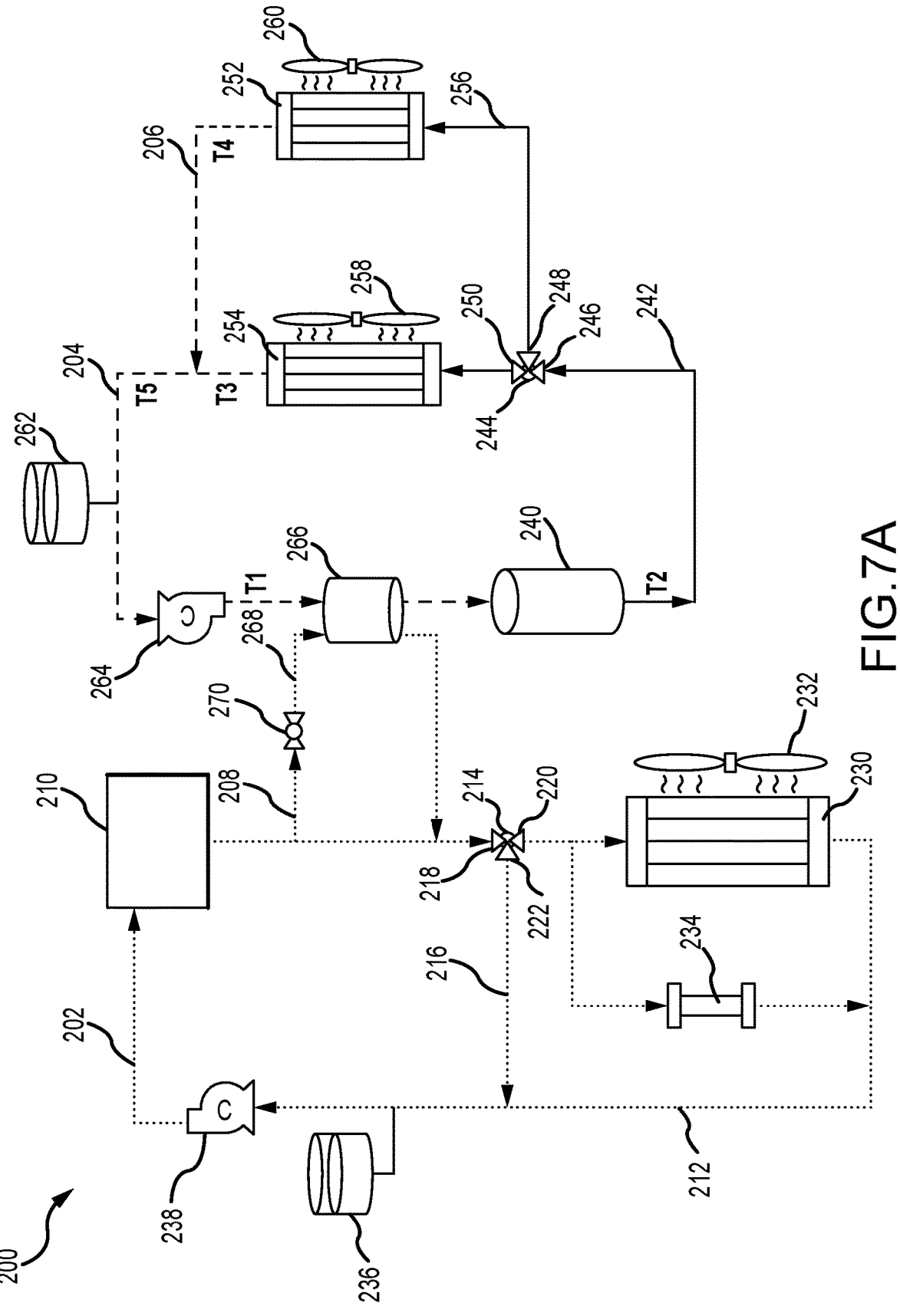
FIGS. 7A-7C illustrate brake resistor cooling and cabin heating operating modes of an integrated thermal management system, in accordance with various embodiments.
Figure 7B:
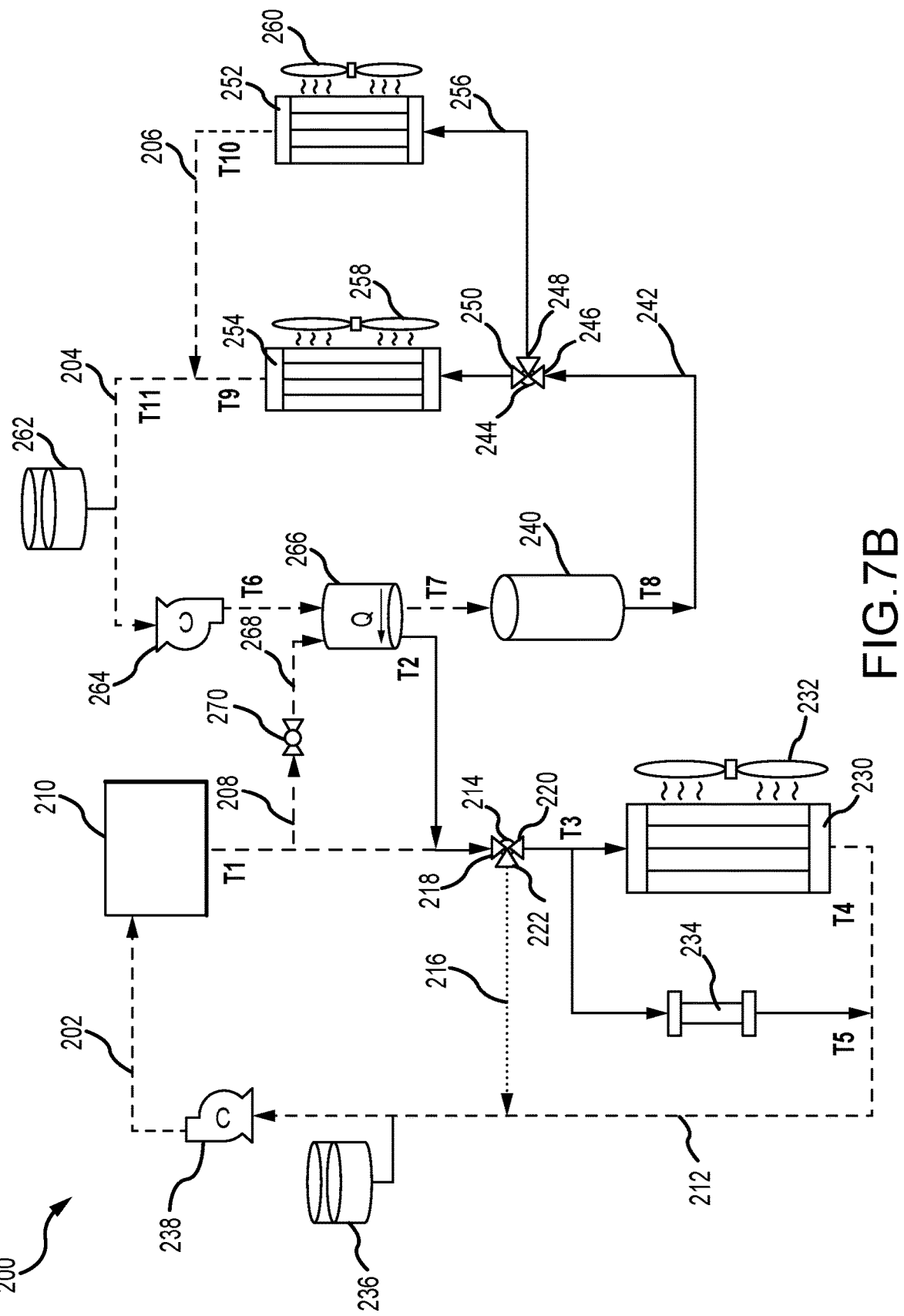
Figure 7C:
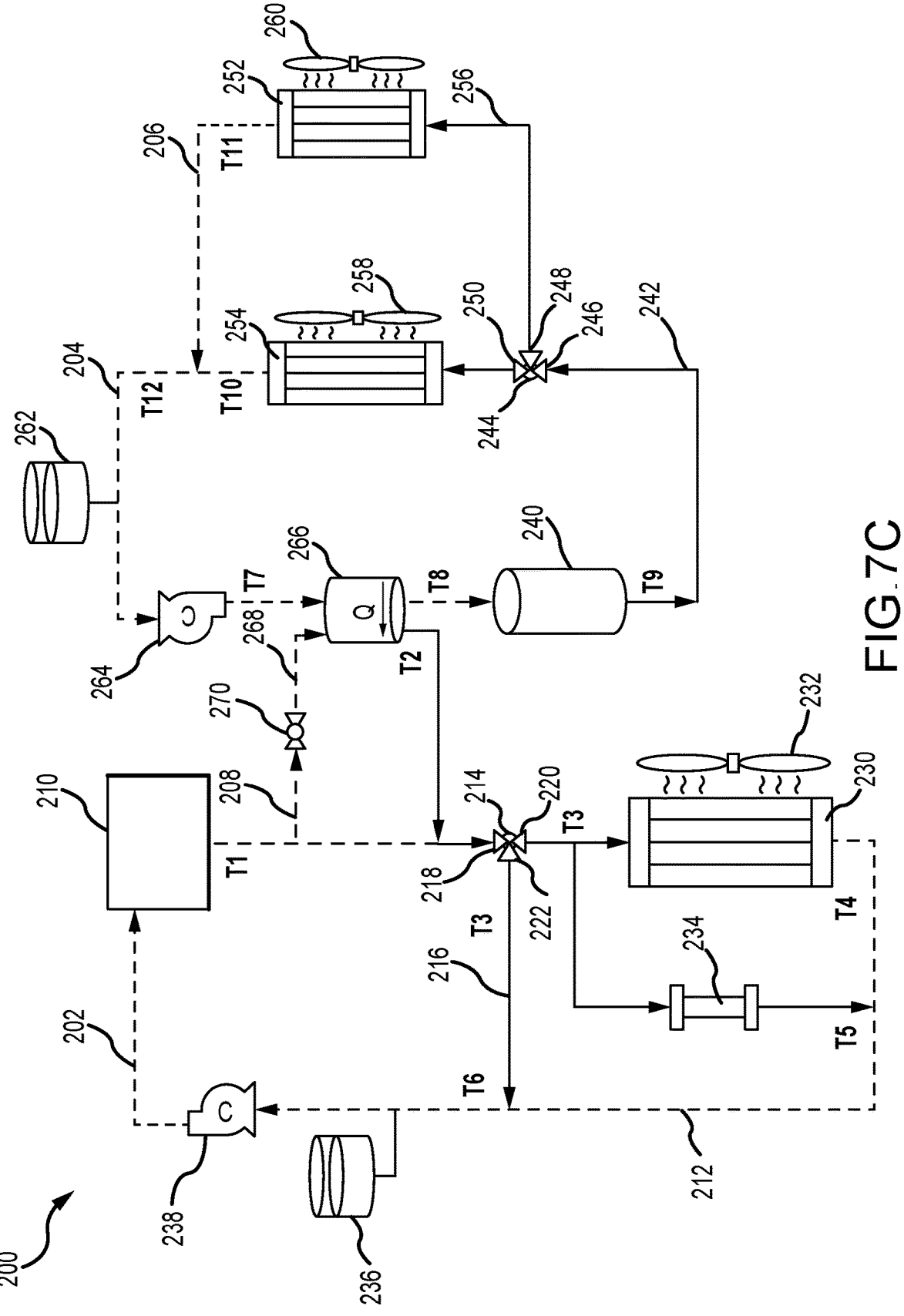

With reference to FIG. 7A, FIG. 7B, and FIG. 7C, integrated thermal management system 200 is illustrated in a first brake resistor cooling and cabin heating operating mode, a second brake resistor cooling and cabin heating operating mode, and a third brake resistor cooling and cabin heating operating mode, respectively, in accordance with various embodiments. In the first brake resistor cooling and cabin heating operating mode, fuel cell coolant loop 202 is off and brake resistor coolant loop 204 is in heater mode. In the second brake resistor cooling and cabin heating operating mode, fuel cell coolant loop 202 is in radiator mode and brake resistor coolant loop is in mixed mode. In the third brake resistor cooling and cabin heating operating mode, fuel cell coolant loop 202 is in mixed mode and brake resistor coolant loop 204 is in mixed mode. The first brake resistor cooling and cabin heating operating mode may be utilized in cold ambient conditions (for example, temperatures less than 15° C.) where battery system 106 is fully charged, thereby causing brake resistor 240 to generate large amounts of heat. The second brake resistor cooling and cabin heating operating mode and the third brake resistor cooling and cabin heating operating mode may be utilized in slightly warmer ambient conditions (for example, temperatures between 15 and 25° C.) where battery system 106 is fully charged, thereby causing brake resistor 240 to generate large amounts of heat.

With attention to FIG. 7A, the first brake resistor cooling and cabin heating operating mode may be substantially similar to the fourth cabin heating operating mode discussed in relation to FIG. 6D. However, in contrast to the fourth cabin heating operating mode, in the first brake resistor cooling and cabin heating operating mode, second bypass valve 244 is positioned such that a first portion of the second coolant is directed through first outlet 248 (to cabin heater core 252) and a second portion of the second coolant is directed through second outlet 250 (to brake resistor radiator 254). As discussed above, second bypass valve 244 may be configured with multiple positions to enable the second coolant to be directed through first outlet 248 and second outlet 250 at any desired ratio. Therefore, in addition to permitting heat transfer to cabin 104 through cabin heater core 252, the first brake resistor cooling and cabin heating operating mode may also permit heat transfer to the external environment via brake resistor radiator 254. As a result, sufficient heat may be dissipated from the second coolant to permit adequate cooling of brake resistor 240. As illustrated, in the first brake resistor cooling and cabin heating operating mode, T2 may be greater than T1, T5, T3, and T4. In various embodiments, T1 may be substantially equal to T5. Depending on the amount of heat transfer in brake resistor radiator 254 and cabin heater core 252, T3 may be greater than T4, T4 may be greater than T3, or T3 and T4 may be substantially equal. Moreover, T5 may be between T3 and T4 or substantially equal to T3 and T4.

With attention to FIG. 7B, the second brake resistor cooling and cabin heating operating mode may be substantially similar to the second brake resistor cooling operating mode discussed in relation to FIG. 4B. However, in contrast to the second brake resistor cooling operating mode, in the second brake resistor cooling and cabin heating operating mode, second bypass valve 244 is positioned such that a first portion of the second coolant is directed through first outlet 248 (to cabin heater core 252) and a second portion of the second coolant is directed through second outlet 250 (to brake resistor radiator 254). As discussed above, second bypass valve 244 may be configured with multiple positions to enable the second coolant to be directed through first outlet 248 and second outlet 250 at any desired ratio. Therefore, in addition to permitting heat transfer to the external environment through brake resistor radiator 258, the second brake resistor cooling and cabin heating operating mode may also permit heat transfer to cabin 104 via cabin heater core 252. As a result, sufficient heat may be dissipated from the second coolant to permit adequate cooling of brake resistor 240. As illustrated, in the second brake resistor cooling and cabin heating operating mode, T2 may be greater than T3, which may be greater than T1, which may be greater than T5, which may be greater than T4. Additionally, T8 may be greater than T6, which may be substantially equal to T11, which may be greater than T7. Additionally, T8 may be greater than T9 and T10. Depending on the amount of heat transfer in brake resistor radiator 254 and cabin heater core 252, T9 may be greater than T10, T10 may be greater than T9, or T9 and T10 may be substantially equal. Moreover, T11 may be between T9 and T10 or substantially equal to T9 and T10.

With attention to FIG. 7C, the third brake resistor cooling and cabin heating operating mode may be substantially similar to the third brake resistor cooling operating mode discussed in relation to FIG. 4C. However, in contrast to the third brake resistor cooling operating mode, in the third brake resistor cooling and cabin heating operating mode, second bypass valve 244 is positioned such that a first portion of the second coolant is directed through first outlet 248 (to cabin heater core 252) and a second portion of the second coolant is directed through second outlet 250 (to brake resistor radiator 254). As discussed above, second bypass valve 244 may be configured with multiple positions to enable the second coolant to be directed through first outlet 248 and second outlet 250 at any desired ratio. Therefore, in addition to permitting heat transfer to the external environment through brake resistor radiator 258, the third brake resistor cooling and cabin heating operating mode may also permit heat transfer to cabin 104 via cabin heater core 252. As a result, sufficient heat may be dissipated from the second coolant to permit adequate cooling of brake resistor 240. As illustrated, in the third brake resistor cooling and cabin heating operating mode, T2 may be greater than T3, which may be greater than T1, which may be greater than T6, which may be greater than T5, which may be greater than T4. Additionally, T9 may be greater than T7, which may be substantially equal to T12, which may be greater than T8. Additionally, T9 may be greater than T10 and T11. Depending on the amount of heat transfer in brake resistor radiator 254 and cabin heater core 252, T10 may be greater than T11, T11 may be greater than T10, or T10 and T11 may be substantially equal. Moreover, T12 may be between T10 and T11 or substantially equal to T10 and T11.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An integrated thermal management system for a fuel cell electric vehicle, comprising:
   a fuel cell system;
   a brake resistor;
   a fuel cell coolant loop comprising a fuel cell radiator thermally and fluidly coupled to the fuel cell system;
   a brake resistor coolant loop comprising a brake resistor radiator thermally and fluidly coupled to the brake resistor; and
   a heat exchanger loop comprising a coolant-coolant heat exchanger thermally and fluidly coupled to the fuel cell coolant loop and the brake resistor coolant loop,
   wherein, in a brake resistor cooling operating mode, heat is transferred from the brake resistor to an ambient environment through the brake resistor radiator, and
   wherein the brake resistor radiator is positioned upstream from the coolant-coolant heat exchanger.

2. The integrated thermal management system of claim 1, wherein the fuel cell coolant loop comprises a first coolant and the brake resistor coolant loop comprises a second coolant.

3. The integrated thermal management system of claim 2, wherein, in the brake resistor cooling operating mode, heat is transferred from the second coolant to the ambient environment through the brake resistor radiator.

4. The integrated thermal management system of claim 3, wherein, in the brake resistor cooling operating mode, heat is transferred from the second coolant to the first coolant in the coolant-coolant heat exchanger.

5. The integrated thermal management system of claim 4, wherein, in the brake resistor cooling operating mode, heat is transferred from the first coolant to the ambient environment through the fuel cell radiator.

6. The integrated thermal management system of claim 1, further comprising a heating, ventilation, and air conditioning (HVAC) coolant loop thermally and fluidly coupled to the brake resistor coolant loop.

7. The integrated thermal management system of claim 6, wherein, in the brake resistor cooling operating mode, the HVAC coolant loop is bypassed.

8. The integrated thermal management system of claim 1, wherein the fuel cell radiator is positioned downstream from the coolant-coolant heat exchanger.

9. The integrated thermal management system of claim 5, wherein a bypass valve is operative such that a first portion of the first coolant is routed through the fuel cell radiator and a second portion of the first coolant is routed through a bypass line.

10. The integrated thermal management system of claim 9, wherein the bypass valve is configured with multiple positions to allow the first portion of the first coolant and the second portion of the first coolant to have a selected ratio therebetween.

11. The integrated thermal management system of claim 6, wherein, in the brake resistor cooling operating mode, heat is transferred from the brake resistor to the HVAC coolant loop and to the fuel cell coolant loop.

12. The integrated thermal management system of claim 11, wherein, in the brake resistor cooling operating mode, the fuel cell coolant loop heats the fuel cell system when the ambient environment around the fuel cell electric vehicle has a temperature of 5 degrees Celsius or below.

13. The integrated thermal management system of claim 11, wherein, in the brake resistor cooling operating mode, the HVAC coolant loop heats a cabin heater core.

14. The integrated thermal management system of claim 13, wherein, in the brake resistor cooling operating mode, a fan transfers heat from the cabin heater core to a cabin of the fuel cell electric vehicle.

15. An integrated thermal management system for a fuel cell electric vehicle, comprising:
   a fuel cell system;
   a brake resistor;
   a fuel cell coolant loop comprising a fuel cell radiator thermally and fluidly coupled to the fuel cell system;
   a brake resistor coolant loop comprising a brake resistor radiator thermally and fluidly coupled to the brake resistor, wherein the brake resistor loop comprises an expansion tank; and
   a heat exchanger loop comprising a coolant-coolant heat exchanger thermally and fluidly coupled to the fuel cell coolant loop and the brake resistor coolant loop,
   wherein, in a brake resistor cooling operating mode, heat is transferred from the brake resistor to an ambient environment through the brake resistor radiator.

16. The integrated thermal management system of claim 15, wherein the fuel cell coolant loop comprises a first coolant and the brake resistor coolant loop comprises a second coolant.

17. The integrated thermal management system of claim 16, wherein, in the brake resistor cooling operating mode, heat is transferred from the second coolant to the ambient environment through the brake resistor radiator.

18. The integrated thermal management system of claim 17, wherein, in the brake resistor cooling operating mode, heat is transferred from the second coolant to the first coolant in the coolant-coolant heat exchanger.

19. The integrated thermal management system of claim 18, wherein, in the brake resistor cooling operating mode, heat is transferred from the first coolant to the ambient environment through the fuel cell radiator.

20. An integrated thermal management system for a fuel cell electric vehicle, comprising:

a fuel cell system;

a brake resistor;

a fuel cell coolant loop comprising a fuel cell radiator thermally and fluidly coupled to the fuel cell system;

a brake resistor coolant loop comprising a brake resistor radiator thermally and fluidly coupled to the brake resistor;

a heat exchanger loop comprising a coolant-coolant heat exchanger thermally and fluidly coupled to the fuel cell coolant loop and the brake resistor coolant loop; and a heating, ventilation, and air conditioning (HVAC) coolant loop thermally and fluidly coupled to the brake resistor coolant loop, wherein, in a brake resistor cooling operating mode, heat is transferred from the brake resistor to an ambient environment through the brake resistor radiator, and wherein, in the brake resistor cooling operating mode, the HVAC coolant loop is bypassed.

\*   \*   \*   \*   \*